(12) United States Patent
Rolston et al.

(10) Patent No.: US 10,120,354 B1
(45) Date of Patent: Nov. 6, 2018

(54) COORDINATED CONTROL OF HOME AUTOMATION DEVICES

(71) Applicant: SmartHome Ventures LLC, Kansas City, MO (US)

(72) Inventors: Mark Edward Rolston, Austin, TX (US); Kevin Michael McDonald, Austin, TX (US); James Arthur Watkins, II, Austin, TX (US); Steven Jay Bosch, Richfield, MN (US)

(73) Assignee: SmartHome Ventures, LLC, Kansas City, MO (US)

( * ) Notice: Subject to any disclaimer, the term of this patent is extended or adjusted under 35 U.S.C. 154(b) by 232 days.

(21) Appl. No.: 15/093,299

(22) Filed: Apr. 7, 2016

Related U.S. Application Data

(60) Provisional application No. 62/144,257, filed on Apr. 7, 2015, provisional application No. 62/153,307, filed on Apr. 27, 2015.

(51) Int. Cl.
| | |
|---|---|
| *G01M 1/38* | (2006.01) |
| *G05B 13/00* | (2006.01) |
| *G05B 15/02* | (2006.01) |
| *H04L 12/28* | (2006.01) |

(52) U.S. Cl.
CPC .......... *G05B 15/02* (2013.01); *H04L 12/2816* (2013.01)

(58) Field of Classification Search
CPC .................................................. H04L 12/2816
USPC .......................................................... 700/275
See application file for complete search history.

(56) References Cited

U.S. PATENT DOCUMENTS

| | | | | |
|---|---|---|---|---|
| 2011/0046792 A1* | 2/2011 | Imes | ...................... | F24F 11/006 700/278 |
| 2013/0263034 A1* | 10/2013 | Bruck | .................. | F24F 11/0086 715/771 |
| 2015/0094865 A1* | 4/2015 | Choi | .................... | F24F 11/0086 700/278 |

OTHER PUBLICATIONS

Wilson, "A First Look at Home Automation on the Apple Watch," fastcodesign.com., retrieved from http://www.fastcodesign.com/3044747/a-first-look-at-home-automation-on-the-apple-watch, Apr. 10, 2015, 9 pp.

* cited by examiner

*Primary Examiner* — Robert Cassity
(74) *Attorney, Agent, or Firm* — Shumaker & Sieffert, P.A.

(57) ABSTRACT

This disclosure describes computer-implemented techniques that enable users to control and coordinate a set of network-enabled home automation devices. Users may generate, customize, and share home automation device dashboards. These dashboards may include user interface elements, such as tiles, that users may use to determine that status of home automation devices and send commands to the home automation devices. In some examples, users may use timeline-based user interfaces to schedule actions to be performed by home automation devices.

17 Claims, 23 Drawing Sheets

COORDINATED CONTROL OF HOME AUTOMATION DEVICES

This application claims the benefit of U.S. Provisional Patent Application No. 62/144,257, filed Apr. 7, 2015, and U.S. Provisional Patent Application No. 62/153,307, filed Apr. 27, 2015, the entire content of each of which is incorporated by reference.

BACKGROUND

Building automation is the centralized control of systems in or around a building. Such systems may include lighting systems, heating and cooling systems, door locks, security alarm systems, video monitoring systems, and so on. While building automation has traditionally been common in large commercial buildings, such as factories and office buildings, building automation has recently expanded to residential buildings and smaller commercial facilities. The extension of building automation into residential buildings and smaller commercial facilities has been enabled in part by the availability of inexpensive network-enabled devices. Such network-enabled devices typically make use of existing network communication technologies (e.g., Wi-Fi, cellular data networks, mesh networks (e.g., ZIGBEE, ZWAVE, etc.), and the Internet) to provide data and receive commands. Conceptually, such network-enabled devices may form part of the so-called "Internet-of-Things."

SUMMARY

In general, this disclosure describes computer-implemented techniques that enable users to control and coordinate a set of network-enabled home automation devices. For example, as described herein, users may generate, customize, and share home automation device dashboards. These dashboards may include user interface elements, such as tiles, that users may use to determine that status of home automation devices and send commands to the home automation devices. Of particular convenience to the user is that such dashboards may include user interface elements corresponding to home automation devices from different manufacturers. Thus, the user is not compelled to use different applications to control home automation devices made by different manufacturers. In a further example, users may use timeline-based user interfaces to schedule actions to be performed by home automation devices.

One or more examples are set forth in the accompanying drawings and the description below. Other features, objects, and advantages will be apparent from the description, drawings, and claims.

DETAILED DESCRIPTION

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words may merely be used to refer to different elements of a same or similar type.

As briefly described above, a home automation system may include a plurality of network-enabled home automation devices. Typically, a user would have to use different applications or webpages to view the statuses of and send commands to home automation devices made by different manufacturers. In other words, there was not a single interface for a user to monitor and command home automation devices made by different manufacturers. The lack of such interfaces has slowed the adoption of home automation systems. Furthermore, the requirement of using different applications or webpages to control home automation devices made by different manufacturers has hindered the ability of consumers to coordinate the activities of home automation devices. In this disclosure, the term home automation device may apply to devices in and around a home, as well as devices in and around commercial facilities, such as offices, farms, factories, and so on.

Various techniques of this disclosure provide unified dashboard interfaces through which a user may monitor and control home automation devices, even if such home automation devices are from different manufacturers. The user may customize such dashboard interfaces for different situations, different people, different devices, and for other reasons. Furthermore, some techniques of this disclosure provide for a timeline view interface that enables the scheduling of future activities to be performed by the home automation devices.

Figure 1:
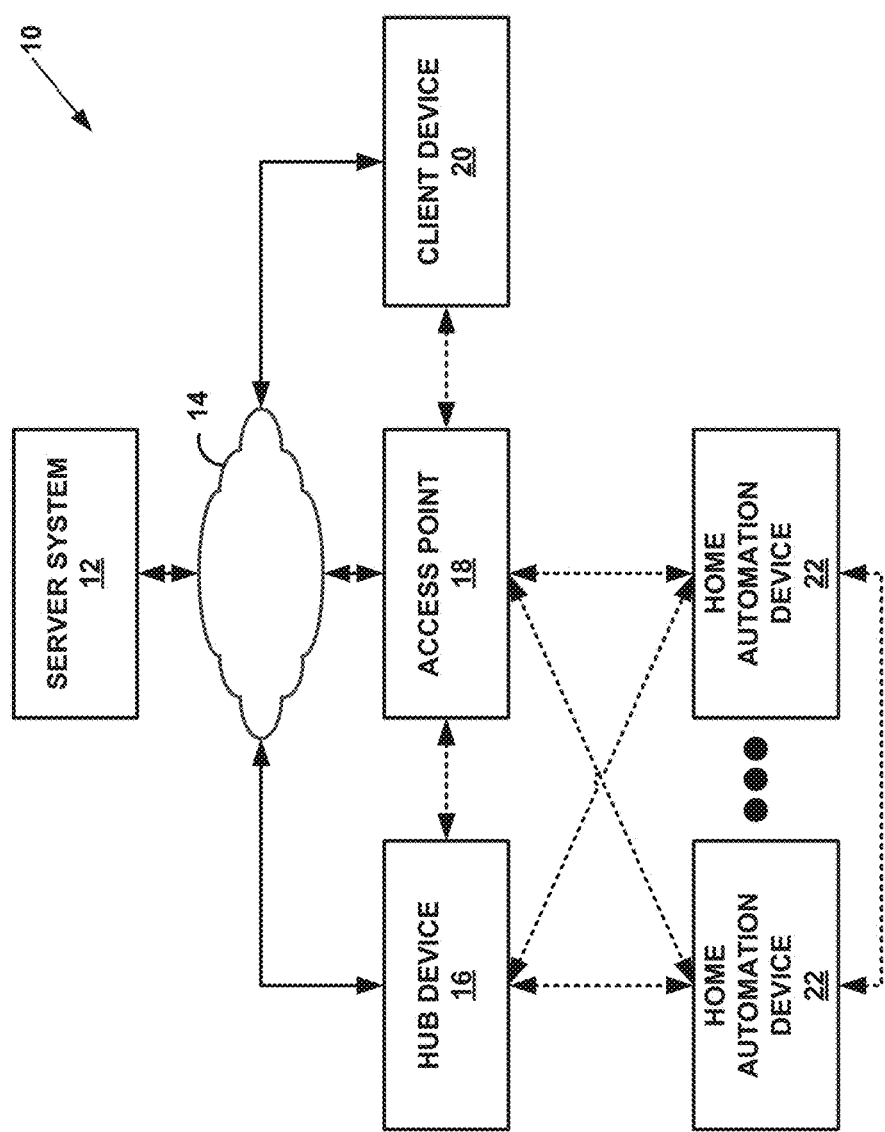
FIG. 1 is a block diagram illustrating an example network system, in accordance with one or more techniques of this disclosure.

FIG. 1 is a block diagram illustrating an example network system 10, in accordance with one or more techniques of this disclosure. In the example of FIG. 1, network system 10 includes a server system 12, a network 14, a hub device 16, an access point 18, a client device 20, and a set of one or more home automation devices 22. In the example of FIG. 1 and throughout this disclosure, home automation devices 22 may also be referred to as "Internet-of-Things" (IoT) devices 22. Other example network systems may include more, fewer, or different components (e.g., devices, systems, networks, etc.).

As described in detail below, network system 10 enables a user of client device 20 to use client device 20 to monitor and control home automation devices 22. In other words, a user may use client device 20 may to configure and monitor home automation devices 22. In various examples, client device 20 comprises various types of devices. For example, client device 20 may comprise a mobile telephone, a tablet computer, a personal computer, a television, a laptop computer, a wearable computing device (e.g., a smartwatch, computerized eyewear), a dedicated wall panel, or another type of device.

Network 14 comprises a communication network that enables computing devices to communicate with each other. In some examples, network 14 comprises the Internet. Furthermore, in some examples, network 14 comprises other networks, such as local area networks, wide area networks, cellular data or voice communication networks, and/or other types of communication networks.

Access point 18 is a device that enables other devices to communicate with network 14. In various examples, access point 18 comprises various types of devices. For example, access point 18 may comprise a wireless access point, such as a Wi-Fi router or cellular network base station. In some examples, access point 18 comprises a modem device, such as a broadband modem. In some examples, client device 20 communicates with network 14 via access point 18 (e.g., through a wired or wireless communication link). Furthermore, in some examples, client device 20 communicates with network 14 via a different access point.

In various examples, home automation devices 22 comprise various types of devices. home automation devices 22 may comprise window or door sensors, light switches or dimmers, thermostats, garage door openers, appliances (e.g., coffeemakers, dishwashers, washing machines, refrigerators, etc.), vehicles, toys, security cameras, baby monitors, fans, air conditioner units, door locks, electrical outlets, smoke alarms, hazardous gas alarms (e.g., carbon monoxide (CO) alarms, natural gas alarms, etc.), garden and yard sprinklers, water faucets, irrigation systems, and many other types of devices that are enabled with network communication abilities.

Different ones of home automation devices 22 may have different parameters. Some home automation devices 22 may have multiple parameters and other ones of home automation devices 22 only have a single parameter. For example, a network-enabled door lock may have a "locked" parameter. In this example, when the "locked" parameter is true, the network-enabled door lock is locked and when the "locked" parameter is false, the network-enabled door lock is unlocked. In this example, the network-enabled door lock may have a "battery life" parameter having a value indicating a remaining battery life of a battery of the network-enabled door lock. In another example, a network-enabled thermostat may have a "target temperature" parameter and an "actual temperature" parameter. In this example, the "target temperature" parameter may indicate a target air temperature and the "actual temperature" parameter may indicate an actual air temperature measured by the thermostat. In another example, a network-enabled door alarm may have an "armed" parameter and a "tripped" parameter. In this example, the "armed" parameter indicates whether the network-enabled door alarm is or is not armed. The "tripped" parameter indicates whether a door was opened while the network-enabled door alarm was armed.

In the example of FIG. 1, hub device 16 communicates wirelessly with one or more home automation devices 22. For instance, hub device 16 may communicate wirelessly with one or more of home automation device 22 via a wireless communication protocol, such as ZIGBEE. In some examples, hub device 16 communicates with network 14 via a wired and/or wireless communication link to access point 18. In other examples, hub device 16 is able to communicate with network 14 without the involvement of access unit 18. Although not shown in the example of FIG. 1, client device 20 may communicate directly with hub device 16, either with or without involvement of access point 18. In some examples, hub device 16 is a specialized device designed for communication with home automation devices 22. In some examples, the functionality of hub device 16 is integrated into access point 18.

In some examples, one or more home automation device 22 communicate with hub device 16. Furthermore, in some examples, one or more of home automation devices 22 communicate with network access point 18. In some examples, some of home automation devices 22 communicate with hub device 12 and some of home automation devices 22 communicate with access point 18. Furthermore, in some examples, home automation devices 22 communicate with each other. For instance, home automation devices 22 may communicate with each other through a mesh network. By communicating with each other through a mesh network, home automation devices 22 may effectively extend the range of the wireless communication abilities of hub device 16 and access point 18. Furthermore, in some examples, client device 20 may communicate wirelessly with particular ones of home automation devices 22. This disclosure may refer to hub device 16 as a proxy device because hub device 16 may act as a proxy to relay commands from server system 12 and/or client device 20 to home automation devices 22 and to relay event data from home automation devices 22 to server system 12 and/or client device 20.

Hub device 16, access point 18, and client device 20 communicate with server system 12 via network 14. Server system 12 comprises one or more computing devices, such as standalone server devices, rack-mounted server devices, or other types of computing devices. Server system 12 performs actions to cause home automation devices 22 to perform actions selected by a user of client device 20.

As described in this disclosure, client device 20 may output a dashboard interface for display at a display device. The dashboard interface includes a set of user interface elements. For ease of explanation, this disclosure may refer to the user interface elements as tiles. However, in some examples, the user interface elements have non-tile forms, such as sliders, toggle switches, drop-down selection boxes, and so on. Furthermore, the tiles may have various shapes, such as squares, rectangles, circles, ovals, and so on. In some examples, a user may choose which tiles to include in a dashboard interface, may rearrange tiles in the dashboard interface, resize tiles in the dashboard interface, or otherwise customize the dashboard interface. Furthermore, in some examples, a tile is not enclosed in a box or other shape, but rather is a collection of one or more elements that operate together. For instance, a tile may consist of an icon and an accompanying label for the icon.

Each respective tile in the dashboard interface corresponds to one or more of home automation devices 22. A user may select which tiles are included in the dashboard interface. A user may instruct a home automation device to perform a particular action by interacting with the tile corresponding to the home automation device. For example, if the home automation device is a door lock, the user may instruct the door lock to lock or unlock by providing a tapping or clicking input on the tile corresponding to the door lock. In another example, the home automation device is a thermostat. In this example, the user may instruct the thermostat to raise or lower a temperature by performing a sliding or dragging gesture on the tile corresponding to the thermostat.

In some examples, responsive to receiving an indication of user interaction with a tile in the dashboard interface, client device 20 outputs a command. The command comprises an indication of an action to be performed by whichever of home automation devices 22 corresponds to the tile. For example, one of home automation devices 22 may be a lamp. In this example, responsive to receiving an indication of a user interaction with a tile corresponding to the lamp, client device 20 may output a command that comprises an instruction for the lamp to turn on or off. For instance, the command may indicate that a target value of an "on/off" parameter of the lamp is "on."

In some examples, client device 20 outputs the command to server system 12. In some such examples, server system 12 may communicate the command, in the same or modified form, to hub device 16 via network 14. Thus, hub device 16 receives data indicating the command from server system 12. Responsive to receiving the data indicating the command, hub device 16 outputs the same or different data indicating the command to the home automation device to which the command is directed. Thus, conceptually, the command generated by client device 20 is forward to the home automation device via server system 12 and hub device 16. In some examples, client device 20 communicates the command to hub device 16 or access point 18 without the involvement of server system 12. Thus, conceptually, the command generated by client device 20 is forwarded to the home automation device via hub device 16 or access point without involvement of server system 12.

In some examples, when server system 12 receives a command from client device 20, server system 12 sends command data to another server system (not shown in FIG. 1). In such examples, the other server system may send, based on the command data received by the other server system, command data to one of home automation devices 22 via access point 18. Furthermore, in some such examples, server system 12 may receive event data from particular home automation devices via the other server system. In such examples, the other server system may act as a proxy device for server system 12. The ability of server system 12 to communicate with particular home automation devices through another server system may be especially useful in situations where the particular home automation devices are configured to only communicate with the other server system, and not with other devices such as hub device 16 or server system 12.

When one of home automation devices 22 receives data indicating a command directed to the home automation device, the home automation device may execute the command. For example, if the home automation device is a network-enabled door lock and the command instructs the home automation device to lock, the home automation device locks. For instance, in this example, the network-enabled door lock may have a "locked" parameter and the command instructs the network-enabled door lock to set the "locked" parameter to true. Accordingly, in this example, the network-enabled door lock sets the "locked" parameter to true, thereby locking. In some examples, the home automation device executes the command immediately. In some examples, the home automation device performs the command after some time delay. The time delay may be specified in the command or a separate communication.

Thus, in some examples, client device 20 output, for display by a display device, a user interface (e.g., a dashboard interface) for monitoring and controlling a plurality of home automation devices (e.g., home automation devices 22). The user interface comprises a plurality of tiles. The plurality of tiles may include one or more user-selected tiles included in the user interface as a result of user input to include the one or more user-selected tiles in the user interface. For each respective tile of the plurality of tiles, the respective tile corresponds to a respective home automation device in the plurality of home automation devices. Furthermore, the respective tile indicates a current status of a parameter of the respective home automation device. The respective tile is associated with a respective command invoked in response to user interaction with the respective tile. In this example, the respective command instructs the respective home automation device to perform an action that modifies the parameter of the respective home automation device. Furthermore, client device 20 may receive an indication of user input to interact with a particular tile from the plurality of tiles. Responsive to the indication of user input to interact with the particular tile, client device 20 may output a command instructing a particular home automation device corresponding to the particular tile to perform an action that modifies a parameter of the particular home automation device.

Similarly, in some examples, server system 12 may send interface data to a client device 20. The interface data may enable client device 20 to output a user interface (e.g., a dashboard interface) for display. In this example, the user interface comprises a plurality of tiles. The plurality of tiles includes one or more user-selected tiles included in the user interface as a result of user input to include the one or more user-selected tiles in the user interface. For each respective tile of the plurality of tiles, the respective tile corresponds to a respective home automation device in a plurality of home automation devices. Furthermore, the respective tile may indicate a current status of a parameter of the respective home automation device. In addition, the respective tile may be associated with a respective command invoked in response to user interaction with the respective tile. The respective command may instruct the respective home automation device to perform an action that modifies the parameter of the respective home automation device. Furthermore, server system 12 may receive, from client device 20, a command instructing a particular home automation device to perform a command associated with a tile corresponding to the particular home automation device. Responsive to receiving the command, server system 12 may send the command to the particular home automation device.

As indicated above, hub device 16 may receive data indicating a command and may output additional data indicating the command. Different types of home automation devices may not be able to interpret the same commands, even if the commands have the same semantic meaning. For instance, the formats of commands to close a garage door may be different for network-enabled garage door openers from different manufacturers. Accordingly, in some examples, hub device 16 receives generic commands from server system 12 or client device 20 and translates the generic commands into commands that can be interpreted by particular types of home automation devices. For example, home automation devices 22 may include a network-enabled garage door opener. In this example, hub device 16 may receive a generic command to close a garage door and convert the generic command into a format usable by a particular network-enabled garage door opener.

In some examples, server system 12 translates generic commands to commands specific to particular ones of home automation devices 22. Thus, in such examples, hub device 16 receives commands conforming to the particular formats required by particular ones of home automation devices 22. Hence, in some examples, server system 12 transforms the command received from client device 20 to a format understood by a particular home automation device and sends the transformed command to the particular home automation device. In such examples, hub device 16 may simply forward the commands to the particular ones of home automation devices 22. In this way, network system 10 may enable a user to control and monitor home automation devices from a variety of manufacturers, even if the home automation devices only accept mutually unintelligible commands.

Furthermore, in some examples of this disclosure, client device 20 may interact with server system 12 to schedule occurrences of specific events. Each of the events may correspond to the performance by a home automation device of an action that modifies a parameter of the home automation devices. As described in detail elsewhere in this disclosure, client device 20 may output a timeline interface for display. The timeline interface may enable a user of client device 20 to schedule events.

For example, client device 20 may output a timeline interface for display. In this example, the timeline interface comprises a current event tile and a staging area. Different positions in the staging area along an axis correspond to different times in the future. The current event tile corresponds to a home automation device, such as one of home automation devices 22. Furthermore, the current event tile indicates a current status of a parameter of the home automation device. For instance, if the home automation device is a door lock, the current event tile may indicate whether or not the door lock is locked. Furthermore, in this example, responsive to an indication of a user interaction with the current event tile, client device 20 sends (e.g., to server system 12) a command instructing the home automation device to perform an action that modifies the parameter of the respective home automation device. Furthermore, in this example, client device 20 may receive an indication of a user input to include a future event tile in the staging area at a position corresponding to a particular time that is in the future. In this example, the future event tile indicates a target status of the parameter of the home automation device. Responsive to the indication of the user input, client device 20 may output, for display, the future event tile in the staging area at the position corresponding to the particular time. Furthermore, client device 20 may send, to server system 12, rule data specifying that the home automation device is to perform an action to attain the target status of the parameter of the home automation device at the particular time.

Figure 2:
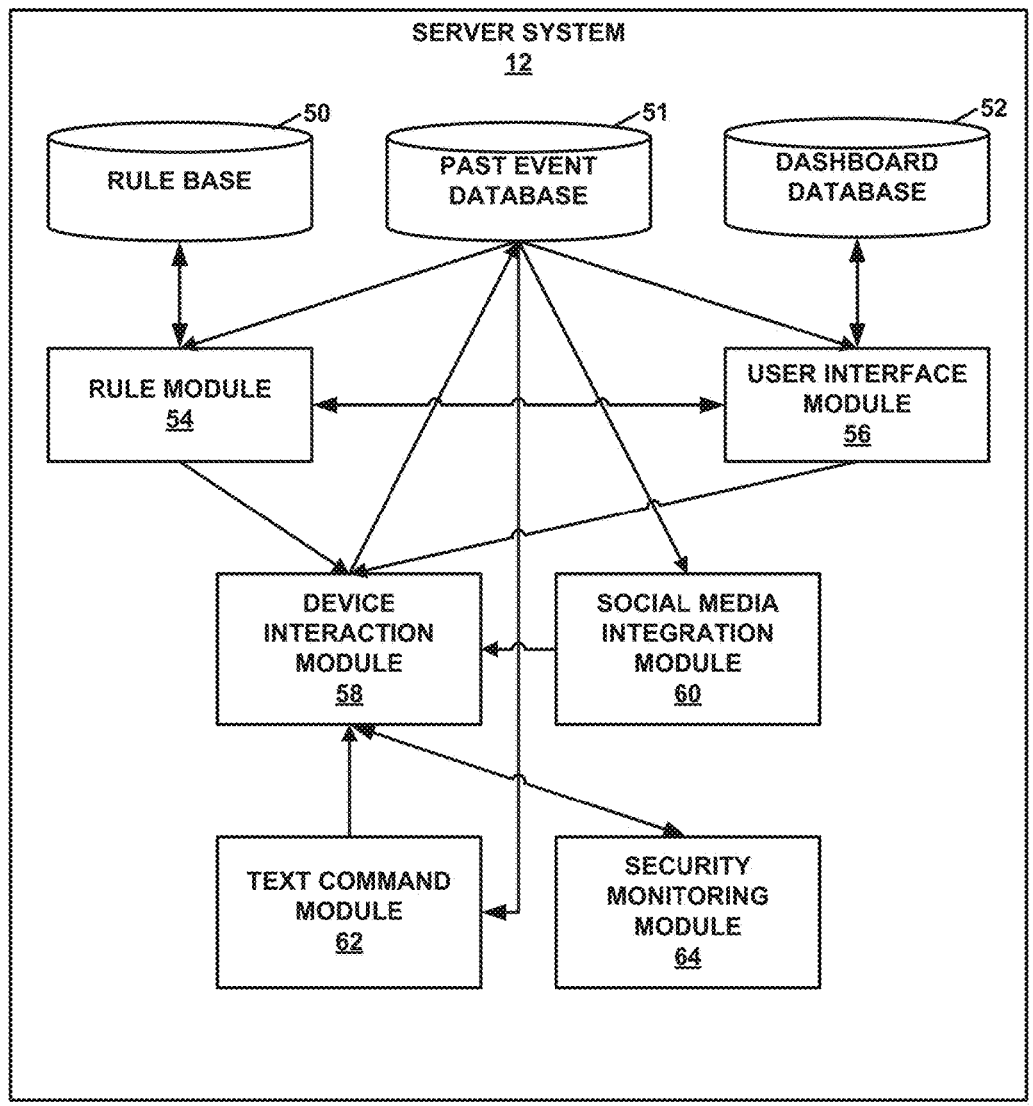
FIG. 2 is a block diagram illustrating an example server system, in accordance with one or more techniques of this disclosure.

FIG. 2 is a block diagram illustrating an example of server system 12, in accordance with one or more techniques of this disclosure. For purposes of illustration, the discussion of FIG. 2 and the following figures includes continued references to FIG. 1. However, the techniques of this disclosure are not so limited.

In the example of FIG. 2, server system 12 includes a rule base 50, a past event database 51, a dashboard database 52, a rule module 54, a user interface module 56, a device interaction module 58, a social media integration module 60, a text command module 62, and a security monitoring module 64. Rule base 50, past event database 51, and dashboard database 52 may be implemented using one or more types of databases, such as relational databases, files, file systems, and so on. Rule module 54, user interface module 56, device interaction module 58, social media integration module 60, text command module 62, and security monitoring module 64 may be implemented as one or more sets of computer-executable instructions stored on one or more computer-readable store media. In some examples, one or more of rule module 54, user interface module 56, device interaction module 58, social media integration module 60, text command module 62, and security monitoring module 64 may be implemented together as a common set of instructions. Furthermore, in some examples, one or more of rule module 54, user interface module 56, device interaction module 58, social media integration module 60, text command module 62, and security monitoring module 64 may be implemented, at least in part, using one or more application-specific integrated circuits.

In the example of FIG. 2, device interaction module 58 is configured to generate commands that instruct home automation devices 22 to perform actions to modify parameters of home automation devices 22. In this disclosure, the occurrence of an action by a home automation device that modifies a parameter of the home automation device may be referred to as an "event." Different types of home automation devices may have different parameters. For example, a network-enabled door lock may have a "locked/unlocked" parameter that indicates whether the network-enabled door lock is locked or unlocked. In another example, a network-enabled lamp may have an "on/off" parameter that indicates whether the network-enabled lamp is on or off. In another example, a dimmer switch may have an "output percentage" parameter that indicates a percentage of electrical power output by the dimmer switch. Thus, parameters of home automation devices may be Booleans, integers, real numbers, or other types of variables.

When a home automation device receives a command from device interaction module 58 that instructs the home automation device to perform an action to modify a parameter of the home automation device such that the parameter has a target value, the home automation device may perform an action to physically modify the parameter of the home automation device such that the parameter has the target value. For example, if the home automation device is a network-enabled lamp and the network-enabled lamp receives a command to modify an "on/off" parameter such that the "on/off" parameter has the value "on," the network-enabled lamp turns on (if not already on).

Device interaction module 58 may generate commands in response to requests from rule module 54 and user interface module 56. Rule module 54 accesses and evaluates a set of rules stored in rule base 50 to determine whether to request device interaction module 58 to generate commands to home automation devices 22. Rule base 50 stores a set of rules. In some examples, for each respective rule in rule base 50, the respective rule corresponds to a respective home automation device. The respective rule specifies a target value of a parameter of the respective home automation device. For example, the respective rule may correspond to a door lock. In this example, the respective rule may specify that a target value of a "locked" parameter of the door lock is true. Additionally, the respective rule may specify one or more criteria, such as times of day. For instance, the criteria may specify one or more particular dates (e.g., Mar. 12, 2015) or may specify a characteristic of a date (e.g., a third Monday of a month).

When rule module 54 determines that the criteria for a rule have been satisfies, rule module 54 may request device interaction module 58 to send a command instructing the home automation device corresponding to the rule to modify a parameter of the home automation device specified by the rule to the target value of the parameter specified by the rule. For example, the rule may correspond to a network-enabled door lock and may specify that a target value of a "locked" parameter is true. In this example, device interaction module 58 may send command data instructing the network-enabled door lock to modify the "locked" parameter such that the "locked" parameter of the network-enabled door lock is true.

In some examples, user interface module 56 receives, from client device 20, rule data specifying a recurrence pattern for a home automation device performing an action to attain the target status of the parameter of the home automation device. Rule module 54 may store such rule data in rule base 50. Furthermore, as a result of evaluating rules in rule base 50, rule module 54 may send, based on the recurrence pattern, commands instructing the home automation device to perform the action to attain the target status of the parameter of the home automation device.

In some examples, device interaction module 58 receives sets of event data. Each set of event data may specify the occurrence of an event at a home automation device. As indicated above, an event may be the occurrence of an action that modifies a parameter of a home automation device. Device interaction module 58 may store the sets of event data, or data based on the received sets of event data, in past event database 51. In this way, past event database 51 may store a record of events. In some examples, device interaction module 58 polls home automation devices 22 to receive sets of event data. In some examples, home automation devices 22 send event data to server system 12 without first receiving requests from server system 12 for the event data. In some examples, home automation devices from different manufacturers provide event data formatted in different ways. Hence, in some examples, device interaction module 58 transforms the event data to a common format for storage in past event database 51.

User interface module 56 provides data to client device 20 to enable client device 20 to present one or more user interfaces for monitoring and controlling home automation devices 22. As described elsewhere in this disclosure, client device 20 may output various dashboard interfaces and timeline interfaces for display. A dashboard interface may include tiles that each correspond to one or more of home automation devices 22. In the example of FIG. 2, dashboard database 52 stores data specifying which tiles are included in a dashboard interface. Additionally, in some examples, dashboard database 52 stores data specifying the sizes and/or arrangement of the tiles included in the dashboard interface. Furthermore, dashboard database 52 may store data specifying user access permissions for dashboard interfaces. For instance, dashboard database 52 may store data specifying a list of users associated with a dashboard interface and whether the users have rights to use a dashboard interface, rights to edit the dashboard interface, rights to delete the dashboard interface, and so on.

Based on data stored in dashboard interface 52 and data stored in past event database 51, user interface module 56 may provide dashboard interface data to client device 20. The dashboard interface data comprises data describing a dashboard interface. For example, user interface module 56 may send dashboard interface data to client device 20 as webpage data (e.g., HTML data), markup language data (e.g., XML data), or another type of data. Client device 20 may use the dashboard interface data to output a dashboard interface for display.

In some examples, user interface module 56 provides timeline interface data to client device 20. The timeline interface data comprises data describing a timeline interface. For example, user interface module 56 may send timeline interface data to client device 20 as webpage data (e.g., HTML data), markup language data (e.g., XML data), or another type of data. Client device 20 may use the timeline interface data to output a dashboard interface for display.

User interface module 56 may use data in past event database 51 to generate particular portions of the dashboard interface data and timeline interface data. For example, user interface module 56 may use data in past event database 51 to specify current or past statuses of home automation devices in dashboard interfaces and timeline interfaces.

User interface module 56 may receive commands from client device 20. For example, user interface module 56 may receive a command to instruct a network-enabled door lock to change a "locked" parameter. Client device 20 may send such commands to user interface module 56 in response to indications of user input with user interfaces, such as dashboard interfaces and timeline interfaces, output by client device 20 for display. In response to a command requesting a home automation device perform an action that modifies a parameter of the home automation device, user interface module 56 may request device interaction module 58 output a command that instructs the home automation device perform the action that modifies the parameter of the home automation device.

Furthermore, user interface module 56 may receive rule data from client device 20. Client device 20 may send such rule data to user interface module 56 in response to indications of user input to user interfaces, such as a timeline interface or a rules interface. The rule data may indicate a condition-action rule for an event. The condition-action rule may specify that an event (i.e., an action that modifies a parameter of a home automation device) is to occur when one or more criteria are satisfied. For example, user interface module 56 may receive rule data indicating that a network-enabled door lock is to modify a "locked" parameter at 10:00 am on Mar. 12, 2015. As described elsewhere in this disclosure, user interface module 56 may receive rule data indicating condition-action rules that are more complex. Responsive to receiving rule data from client device 20, user interface module 56 may request rule module 54 modify rule base 50 based on the rule data.

Furthermore, in some examples, server system 12 stores metadata regarding home automation devices 22. In some examples, server system 12 stores the metadata regarding home automation devices 22 in dashboard database 52 or elsewhere. The metadata regarding a home automation device may specify an account with which the home automation device is associated. In general, a user is unable to monitor or control a home automation device (e.g., via a dashboard interface or a timeline interface) unless the user's account is associated with the home automation device. In addition, the metadata regarding a home automation device may include a user-specified name for the home automation device. For instance, a user may specify that a name of a particular home automation device is a "living room lamp." Other types of metadata regarding a home automation device may include metadata specifying a device type of the home automation device, a location of the home automation device, a manufacturer of the home automation device, freeform notes regarding the home automation device, an installation date of the home automation device, and so on. In some examples, the interface data send by server system 12 to client device 20 may be based at least in part on the metadata.

Furthermore, in some examples, the metadata regarding a home automation device may include tag data regarding the home automation device. A tag may comprise a non-hierarchical keyword or term assigned to the home automation device. The tag data may help describe the home automation device and allow the home automation device to be found by browsing or searching. In some examples, a user may assign tags to home automation devices from a predetermined set of tags. In some examples, a user may define tags to assign to home automation devices.

In some examples, software systems may analyze the metadata associated with home automation devices to detect patterns. For example, based on the metadata of home automation devices associated with a particular user's account, a software system may determine that the particular user might be interested in purchasing one or more additional home automation devices. For instance, the software system may determine that the particular user has several security-related home automation devices, such as network-enabled door alarms, but does not have any network-enabled window alarms. Accordingly, promotional material regarding network-enabled window alarms may be sent to the particular user.

In some examples, social media integration module 60 interacts with one or more social media systems to post event notifications related to home automation devices 22. Example social media systems include FACEBOOK, TWITTER, SNAPCHAT, LINKEDIN, GOOGLE+, FACEBOOK MESSENGER, INSTAGRAM, VKONTAKTE, SINA WEIBO, and so on. An event notification related to a home automation device may comprise information that notifies a user regarding an event involving the home automation device. In the example of FACEBOOK, an event notification may take the form of a "status" message. In the example of TWITTER, an event notification may take the form of a "tweet."

Social media integration module 60 may use data stored in past event database 51 to generate event notifications to post to the one or more social media systems. For example, home automation device 22 may include a network-enabled door lock. In this example, past event database 51 may store event data indicating that a "locked/unlocked" parameter of the network-enabled door lock attained an "unlocked" value at a particular time and date. Accordingly, in this example, social media integration module 60 may post an event notification to a social media system indicating that the network-enabled door lock was unlocked at the particular time and date.

Access to the event notifications posted by social media integration module 60 may limited to particular users. For example, social media integration module 60 may post event notifications to a specific "feed" or "page." In this example, the social media system grants only particular users read access to the "feed" or "page." In this example, a user may subscribe to the "feed" or "page" to which social media integration module 60 posts event notifications. In some examples, event notifications posted by social media integration module 60 may appear in a subscribing user's general news feed. The user's general news feed may include posts from other users of the social media system.

Furthermore, in some examples, social media integration module 60 receives commands from users via a social media system. For example, social media integration module 60 may receive, from a user, via the social media system, an instruction to lock a particular network-enabled door lock. In the example of FACEBOOK, the user may write a "wall post" to an account to which social media integration module 60 posts event notifications regarding the user's home automation devices. In this example, the "wall post" may specify the command (e.g., "lock the front door"). In the example of TWITTER, the user may write a private message to an account to which social media integration module 60 posts event notifications regarding the user's home automation devices. In this example, the private message may specify the command. Hence, in such examples, social media integration module 60 may receive, from a social media system, a message specifying a command. The second command instructs the particular home automation device to perform a particular action to modify a parameter of the particular home automation device. Responsive to receiving the message, social media integration module 60 may send the second command to the particular home automation device.

Text command module 62 may receive command strings. Each command string comprises a string of characters expressing a command. For example, "lock the front door" is an example of a command string. In some examples, the command strings take the form of text messages (e.g., SMS messages) or instant messenger messages (e.g., FACEBOOK MESSENGER messages, GOOGLE HANGOUT messages, etc.). Text command module 62 may receive rule data in a similar manner. Responsive to receiving a command string, text command module 62 may interpret the command string to determine an intended command and send the intended command to device interaction module 58 for execution. Device interaction module 58 may the interact with one or more devices to implement the command. Thus, in general terms, server system 12 may receive a command string specifying a target event (i.e., the performance of an action by a home automation device that modifies a parameter of the home automation device). Server system 12 may output a command instructing the home automation device to perform the target event.

In some examples, text command module 62 receives a command string from a virtual personal assistant system or other voice-to-text conversion system. Example virtual personal assistant systems include the SIRI system from APPLE, INC., the CORTANA system from MICROSOFT CORP., and GOOGLE NOW from GOOGLE, INC. For example, such virtual personal assistant systems convert voice instructions to text messages, such as SMS messages. For instance, the SIRI system sends a text message to a recipient in response to a voice command of the form, "Hey Siri, send a text to [recipient] saying [message]." In this example, the recipient may be an account associated with the user's home automation devices and the message may be a command. Thus, in one example, if a user's home automation devices include a network-enabled door lock named "front door," the user may command server system 12 to lock the front door by speaking, "Hey Siri, send a text to my house saying lock the front door."

Furthermore, in some examples, text command module 62 may receive a command string expressing a request for a status of a home automation device. In response, text command module 62 may interpret the command string and access data in past event database 51 to determine a status of the home automation device. Text command module 62 may then generate a response, based at least in part on data in past event database 51, indicating the status of the home automation device. Text command module 62 may send the response in the form that text command module 62 received the command string. For instance, if text command module 62 received the command string in an SMS text from a user's phone, text command module 62 may send the response as an SMS text to the user's phone. In another example, text command module 62 may receive the command string from a virtual personal assistant system. Hence, in this example, text command module 62 may send a response to the virtual personal assistant system, which converts the response into speech. Thus, in one example, a user may say, "Hey Siri, send a text to my house asking if the front door is locked." In this example, from the user's perspective, the SIRI system may respond by saying, "Yes, the front door is locked" or "No, the front door is not locked." In this way, the user may have experience of interacting with the user's home automation devices in a hands-free manner using a virtual assistant system.

Additionally, in some examples, text command module 62 may generate a text question based at least in part on data in past event database 51. In one example, text command module 62 may send the text question to a client device, e.g., as an SMS text. In another example, text command module 62 may send the text question to a virtual personal assistant system. Hence, in this example, text command module 62 may send a response to the virtual personal assistant system, which converts the text question into speech. Thus, in one example, a user may say, "Hey Siri, send a text to my house asking if the front door is locked." In this example, from the user's perspective, the SIRI system may respond by saying, "Yes, the front door is locked. Would you like me to unlock it?" or "No, the front door is not locked. Would you like me to lock it?" The user may respond to the text question with a command, such as "Yes" or "Please lock the front door."

Thus, in general, text command module 62 may generate a text question based at least in part on event data from a particular home automation device. The text question may inquire whether a user wants to modify a parameter of the particular home automation device. Text command module 62 may send the text question to a client device. Alternatively, text command module 62 may send the text question to a virtual personal assistant system configured to convert the text question to speech.

In some examples, a virtual personal assistant system may be configured accept and interpret specialized voice commands related to the user's home automation devices. Thus, the user may simply speak to their virtual personal assistant, "Lock the front door" or "Is the front door locked?" Such specialized voice commands may make the user experience feel seamless.

In the example of FIG. 2, server system 12 includes security monitoring module 64. In some examples, a user's home automation devices include one or more security-related devices, such as security cameras, window and door alarms, window and door locks, smoke detectors, carbon monoxide detectors, natural gas detectors, and so on. Traditional security monitoring services receive data from security-related devices. Such traditional security monitoring services have people and devices that use the received data to intervene in the event of an emergency, such as a burglary, fire, or gas leak. However, many users only arm their security monitoring services when they expect to be away from home for an extended time amount of time. Thus, many users apparently only feel the need for security monitoring services a limited number of days in a year. However, users typically pay a monthly fee to traditional security monitoring services whether or not the users arm their security monitoring services.

Figure 22:
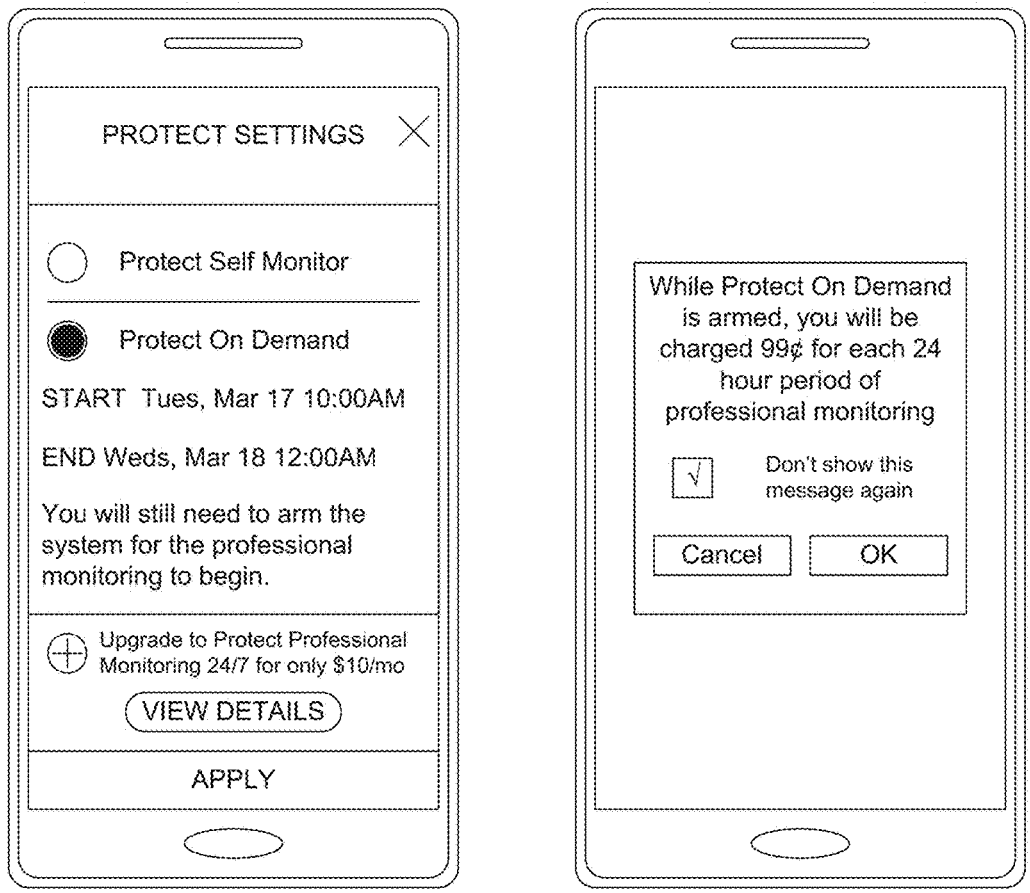
FIG. 22 is a series of screen diagrams for turning on a security service, in accordance with one or more techniques of this disclosure.

Security monitoring module 64 may enable users to request security monitoring services on demand. For example, when security monitoring module 64 receives instructions to enable security monitoring services for a user, security monitoring module 64 may send security-related data to a security monitoring service. The security-related data may comprise data generated from the user's security-related home automation devices. Example security-related data may include video data from security cameras, data indicating the tripping of alarms, data indicating the presence of smoke or hazardous gas, and so on. FIG. 22 is a series of screen diagrams for turning on a security service using a smartphone, in accordance with one or more techniques of this disclosure. In some examples, the user may be required to provide an authentication factor, such as a PIN, prior to activation of the security service.

In some examples, security monitoring module 64 may monitor event data in past event database 51 for events associated with an emergency (i.e., security-related events). For example, a user's home automation devices may include a network-enabled door alarm. In this example, if the network-enabled door alarm detects that a door has opened when the door alarm is armed, the network-enabled door alarm may send event data to server system 12 indicating this fact. In this example, the event indicating that the door has opened when the door alarm is armed is a security-related event. Furthermore, in this example, if the user has enabled security monitoring services, security monitoring module 64 monitors events from the user's home automation devices for security-related events. In this example, security monitoring module 64 may send security-related data based on security-related events to a security monitoring service.

Furthermore, in some examples, security monitoring module 64 may receive data from a security monitoring service. Based on the received data, security monitoring module 64 may communicate commands or other types of data to device interaction module 58. Based on the commands or other types of data received from security monitoring module 64, device interaction module 58 may output data targeted to particular home automation devices. For example, security monitoring module 64 may receive voice data from a security monitoring service. In this example, the voice data may represent a spoken message threatening burglars that police have been alerted. In this example, device interaction module 58 may relay the voice data to a home automation device equipped with a speaker to output the voice data. In another example, in the event of a fire, security monitoring module 64 may receive commands to unlock doors to aid ingress of firefighters and/or egress of occupants. In this example, device interaction module 58 may send unlock commands to network-enabled door locks. In some examples, security monitoring module 64 may provide notifications to client devices based on alerts or other notifications received from the security monitoring service. Such alerts or other notifications may be user-configurable.

Hence, in some examples, server system 12 may receive event data from one or more home automation devices 22. Server system 12 may send interface data to a client computing device (e.g., client device 20). The interface data may enable the client computing device to output a user interface for display. In this example, the user interface comprises data indicating current statuses of the one or more home automation devices. Furthermore, in this example, the data indicating current statuses of the one or more home automation devices is based on the event data received from the one or more home automation devices. Server system 12 may receive an indication of user input to start using a security monitoring service that monitors a premises for emergencies. Responsive to the indication of the user input to activate the security monitoring services, server system 12 may send security-related data to the security monitoring service. The security-related data is based on the event data. Additionally, in some examples, server system 12 receives a command from the security monitoring service. The command instructs a particular home automation device of the one or more home automation devices to perform an action. Responsive to receiving the command, server system 12 sends the command to the particular home automation device. In some examples, server system 12 receives a voice data from the security monitoring service. Responsive to receiving the voice data, server system 12 sends the voice data to the particular home automation device.

In some examples, a user is responsible for the purchase, installation, and maintenance of the user's home automation devices. Thus, the cost of purchasing, installing, and maintaining security-related home automation devices may fall on the user, not the security monitoring service. As a result, overhead of the security monitoring service is lower, thereby making a business model of security monitoring services on demand more economical to a business providing the security monitoring services.

Figure 3:
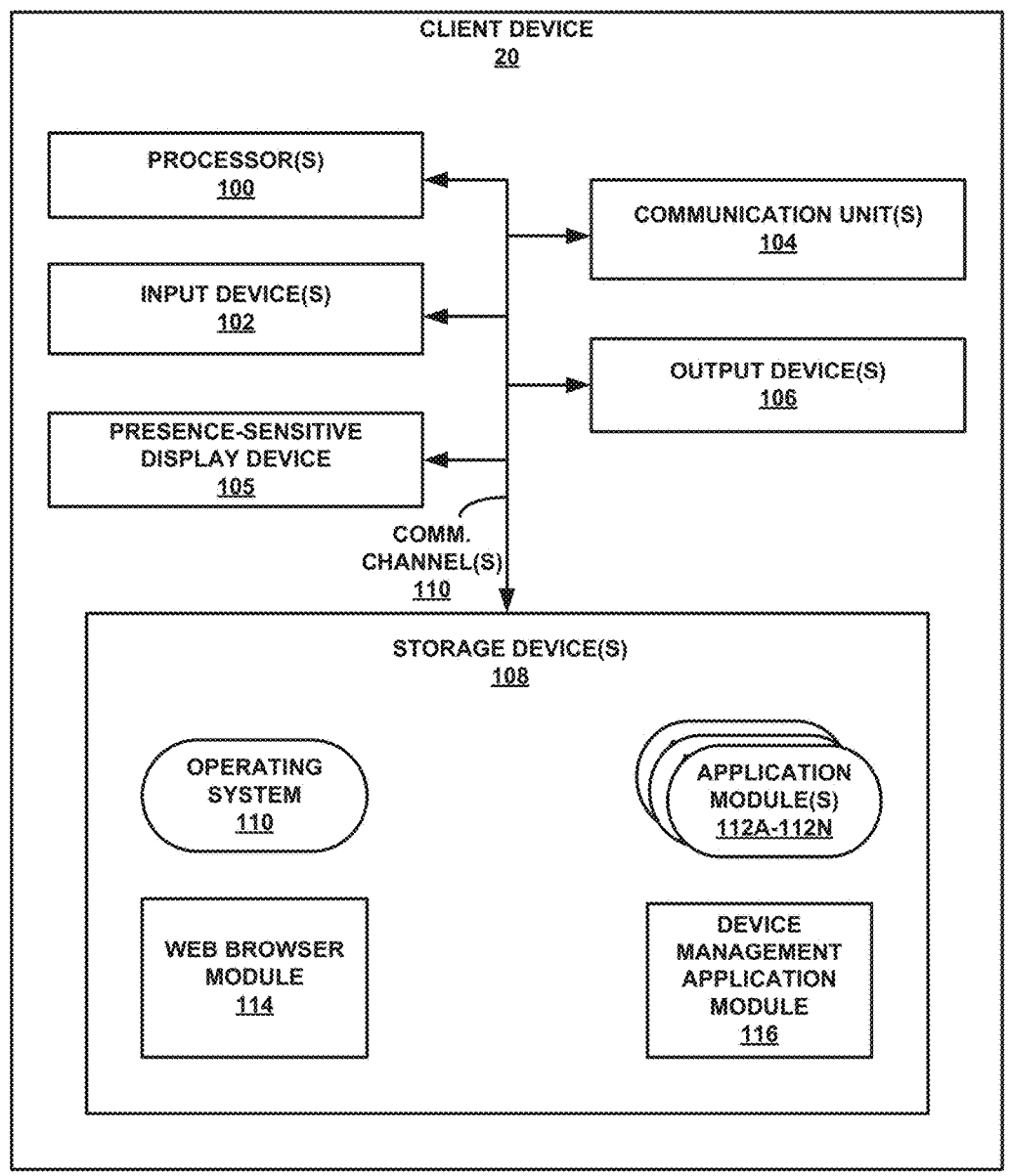
FIG. 3 is a block diagram illustrating an example client device, in accordance with one or more techniques of this disclosure.

FIG. 3 is a block diagram illustrating an example of client device 20, in accordance with one or more techniques of this disclosure. FIG. 3 illustrates only one particular example of client device 20, and many other example configurations of client device 20 exist.

As shown in the example of FIG. 3, client device 20 includes one or more processors 100, one or more input devices 102, one or more communication units 104, a presence-sensitive display device 105, one or more output devices 106, one or more storage devices 108, and one or more communication channels 110. Client device 20 may include many other components. For example, client device 20 may include physical buttons, microphones, speakers, communication ports, and so on.

Communication channels 100 may interconnect each of the components 100, 102, 104, 105, 106, and 108 for inter-component communications (physically, communicatively, and/or operatively). In some examples, communication channel(s) 100 may include a system bus, a network connection, an inter-process communication data structure, or any other method for communicating data.

One or more storage device(s) 108 within client device 20 may store information required for use during operation of client device 20. Storage device(s) 108, in some examples, have the primary purpose of being a short term and not a long-term computer-readable storage medium. Storage device(s) 108 may be volatile memory and may therefore not retain stored contents if powered off. Examples of volatile memories may include random access memories (RAM), dynamic random access memories (DRAM), static random access memories (SRAM), and other forms of volatile memories known in the art. Storage devices 108 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories. In some examples, processor(s) 100 of client device 20 read and may execute instructions stored by storage device(s) 108.

Client device 20 may include one or more input device(s) 102 that client device 20 uses to receive user input. Examples of user input include tactile, audio, and video user input. Input device(s) 102 may include presence-sensitive screens, touch-sensitive screens, mice, keyboards, voice responsive systems, video cameras, microphones or other types of devices for detecting input from a human or machine.

Communication unit(s) 104 may enable client device 20 to send data on and receive data from a communications network, such as a local area network or the Internet. In some examples, communication unit(s) 104 may include wireless transmitters and receivers that enable client device 20 to communicate wirelessly with the communications network.

Presence-sensitive display device 105 is configured display graphical data and detect the presence of one or more input objects, such as fingers or styli. Presence-sensitive display device 105 may be implemented using various technologies. For example, presence-sensitive display device 105 may be implemented using a resistive touchscreen, a surface acoustic wave touchscreen, a capacitive touchscreen, a projective capacitance touchscreen, an acoustic pulse recognition touchscreen, or another touchscreen technology. In some examples, presence-sensitive display device 105 may be able to detect the presence of an input object without the input object physically touching presence-sensitive display device 105. Rather, in such examples, presence-sensitive display device 105 may be able to detect the presence of the input object when the input object is within a particular space.

Output device(s) 106 may generate output. Examples of output include tactile, audio, and video output. Output device(s) 106 may include display screens, sound cards, video graphics adapter cards, speakers, cathode ray tube (CRT) monitors, liquid crystal displays (LCD), or other types of devices for generating output.

Processor(s) 100 may read instructions from storage device(s) 108 and may execute instructions stored by storage device(s) 108. Execution of the instructions by processors 100 may configure or cause client device 20 to provide at least some of the functionality ascribed in this disclosure to client device 20. As shown in the example of FIG. 3, storage device(s) 108 include computer-readable instructions associated with operating system 110, application modules 112A-112N (collectively, "application modules 112"), a web browser module 114, and a device management application module 116. Execution of instructions associated with operating system 110 may cause client device 20 to perform various functions to manage hardware resources of client device 20 and to provide various common services for other computer programs. Execution of instructions associated with application modules 112 may cause client device 20 to provide various applications (e.g., "apps").

Web browser module 114 comprises instructions that, when executed, cause client device 20 to provide a web browser application. In some examples, the web browser application may retrieve, from server system 12, web pages comprising user interfaces that a user of client device 20 may use to manage home automation devices. For example, the web browser application may retrieve, from server system 12, web pages comprising dashboard interfaces, timeline interfaces, and/or other types of user interfaces. Furthermore, the web browser application may send command data, rule data, or other types of data to server system 12.

Device management application module 116 comprises instructions that, when executed, cause client device 20 to output, for display at a display device (e.g., presence-sensitive display device 105), user interfaces that a user of client device 20 may use to manage home automation devices. For example, device management application module 116 may obtain interface data from server system 12. Device management application module 116 may output, for display at a display device, such as presence-sensitive display device 105, based on the interface data, dashboard interfaces, timeline interfaces, and/or other types of user interfaces. Furthermore, device management application module 116 may send command data, rule data, or other types of data to server system 12.

Figure 4:
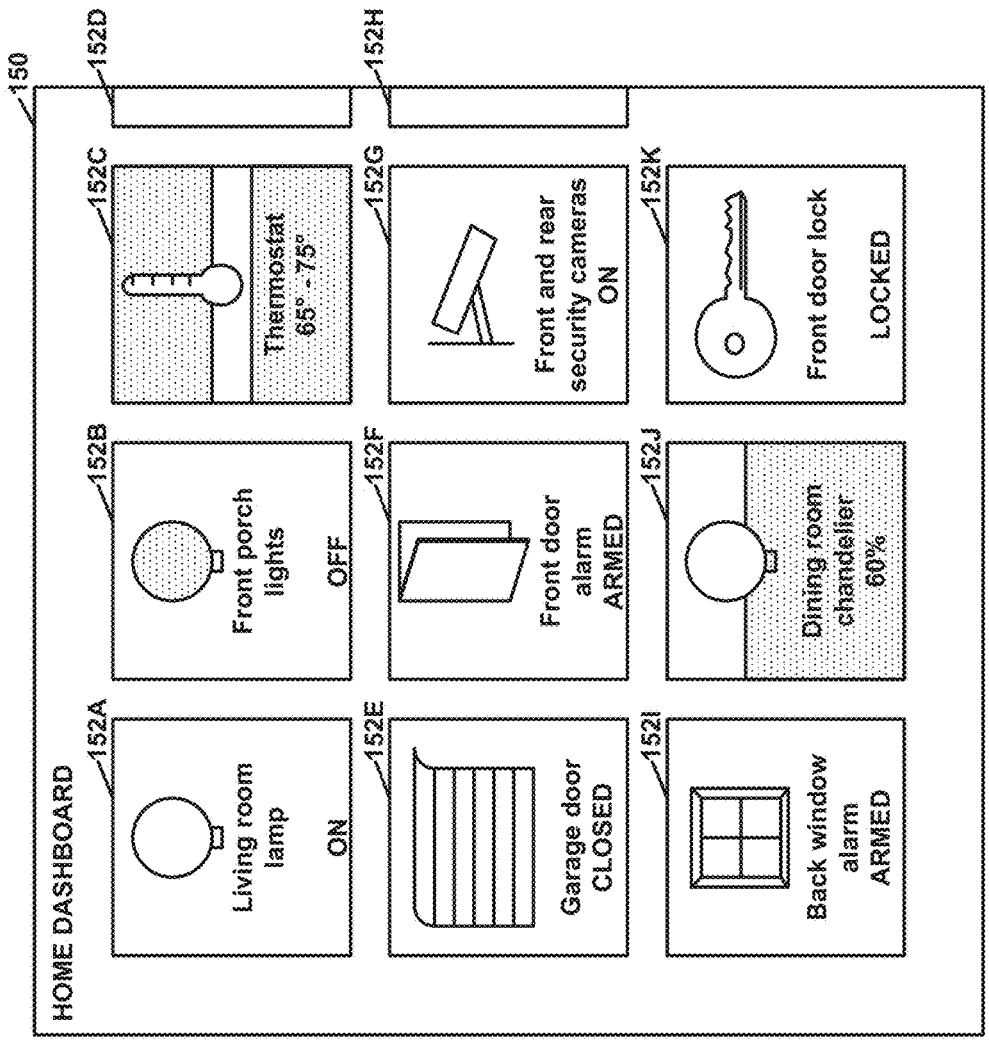
FIG. 4 is a conceptual diagram illustrating an example dashboard interface, in accordance with one or more techniques of this disclosure.

FIG. 4 is a conceptual diagram illustrating an example dashboard interface 150, in accordance with one or more techniques of this disclosure. Client device 20 may output dashboard interface 150 for display.

In the example of FIG. 4, dashboard interface 150 includes a plurality of tiles 152A-152K (collectively, "tiles 152"). In the example of FIG. 4, there is not sufficient room to display all of tiles 152 concurrently. Accordingly, some tiles may not displayed in dashboard interface 150 and some tiles, such as tiles 152D and 152H, may be partially displayed in dashboard interface 150. Client device 20 may scroll dashboard interface 150 in response to receiving an indication of user input, thereby revealing additional tiles in dashboard interface 150.

Each of tiles 152 may correspond to a different home automation device. For example, tile 152A corresponds to a living room lamp, tile 152B corresponds to front porch lights, tile 152C corresponds to a thermostat, and so on. Each of tiles 152 may indicate a status or setting of a home automation device corresponding to the tile. For instance, in the example of FIG. 4, tile 152A indicates that the living room lamp is currently on and tile 152B indicates that the front porch lights are off. The status of a home automation device may be determined based on event data provided by the home automation device to server system 12. Furthermore, as described in greater detail elsewhere in this disclosure, client device 20 may output a command to a home automation device in response to receiving an indication of user interaction with a tile corresponding to the home automation device.

Client device 20 may rearrange tiles 152 within dashboard interface 150 in response to receiving one or more indications of user input. For example, client device 20 may put dashboard interface 150 in a tile rearrangement mode in response to receiving an indication of a particular user input, such as a long press on one of tiles 152. In this example, when dashboard interface 150 is in the tile rearrangement mode, client device 20 may move a tile from a first position within dashboard interface 150 to a second position within dashboard interface 150 in response to receiving an indication of user input to drag the tile from the first position to the second position. In this example, if another tile is already at the second position, client device 20 may move the other tile, and potentially one or more additional tiles, to other positions within dashboard interface 150.

Furthermore, client device 20 may remove a tile from dashboard interface 150 in response to an indication of user input to remove the tile from dashboard interface 150. For example, client device 20 may remove a tile from dashboard interface 150 in response to receiving an indication of user input to drag the tile to a particular location within dashboard interface 150 or in response to receiving a tapping or clicking input on a deletion control associated with the tile.

In some examples, a single tile in dashboard interface 150 may correspond to multiple home automation devices. For example, in the example of FIG. 4, tile 152 may correspond to a front security camera and also correspond to a separate rear security camera. When a tile corresponds to multiple home automation devices, client device 20 may send commands for each of the home automation devices in response to receiving an indication of a single user input on the tile. For example, client device 20 may output a command instructing the front security camera to turn off and a command instructing the rear security camera to turn off in response to receiving an indication of a tapping or clicking user input on tile 152G.

In some examples, client device 20 may generate a tile corresponding to multiple home automation devices when client device 20 receives an indication of user input to drag a tile corresponding to a first home automation device to a tile corresponding to one or more other home automation devices. Furthermore, in some instances, client device 20 may output a configuration interface for display in response to receiving an indication of user input to drag a tile to another tile. The configuration interface may enable the user to specify what actions are to be performed when client device 20 receives indications of user input on the tile corresponding to the multiple devices.

In this way, responsive to receiving an indication of a user input, client device 20 may generate a tile corresponding to multiple home automation devices of the plurality of home automation devices. Responsive to an indication of user input to interact with the tile corresponding to the multiple home automation devices, client device 20 may output one or more commands instructing the home automation devices corresponding to the second tile to perform actions that modify parameters of the home automation devices corresponding to the second tile. Furthermore, in some examples, the home automation devices corresponding to the tile include a first home automation device and a second home automation device and the dashboard interface comprises a first tile corresponding to the first home automation device and a second tile corresponding to the second home automation device. In this example, client device 20 may receive the indication of the user input, which comprises a gesture dragging the first tile to the second tile.

The use of tiles corresponding to multiple devices may enable the user to perform particular tasks more efficiently. For example, a single tile may correspond to a front door lock, an entryway light, and a front door alarm system. In this example, client device 20 may send commands to unlock the front door lock, turn on the entryway light, and disarm the front door alarm in response to receiving an indication of user input to select the tile. Likewise, in the example, client device 20 may send commands to lock the front door lock, turn off the entryway light, and arm the front door alarm in response to receiving another indication of user input to select the tile.

In some examples, a dashboard interface, such as dashboard interface 150, may include one or more tiles corresponding to services. Such services are not necessarily provided by home automation devices. For example, a service may comprise a data source, such as a source of weather information. Accordingly, in this example, a tile in a dashboard interface may display weather information. In another example, a tile may correspond to a real-world service, such as a transportation service, housekeeping services, laundry services, food delivery or takeout service, and so on. In this example, client device 20 may output a command requesting transportation (e.g., a car) in response to an indication of user input directed to the tile. Furthermore, tiles corresponding to real world services may contain status information regarding the real word service. For example, a tile may contain information about a transportation service, such as an estimated pickup time for a requested vehicle. In some examples, server system 12 may receive data from such services in the same or similar manner as event data. In other examples, client device 20 may receive information from such services directly.

In some examples, client device 20 may output a command input interface for a tile in response to receiving an indication of user input directed to the tile. For instance, client device 20 may output a command input interface for a tile in response to receiving an indication of a tapping gesture or long press gesture directed to the tile. The command input interface for a tile may include user interface features for specifying a command. For example, a tile may correspond to an audio streaming device. In this example, the command input interface for the tile may include user interface features enabling the user to select music to playback on the audio stream device. In another example, a tile corresponds to a transportation service and the command input interface for the tile includes user interface features specifying a pickup location and a destination location.

Figure 5A:
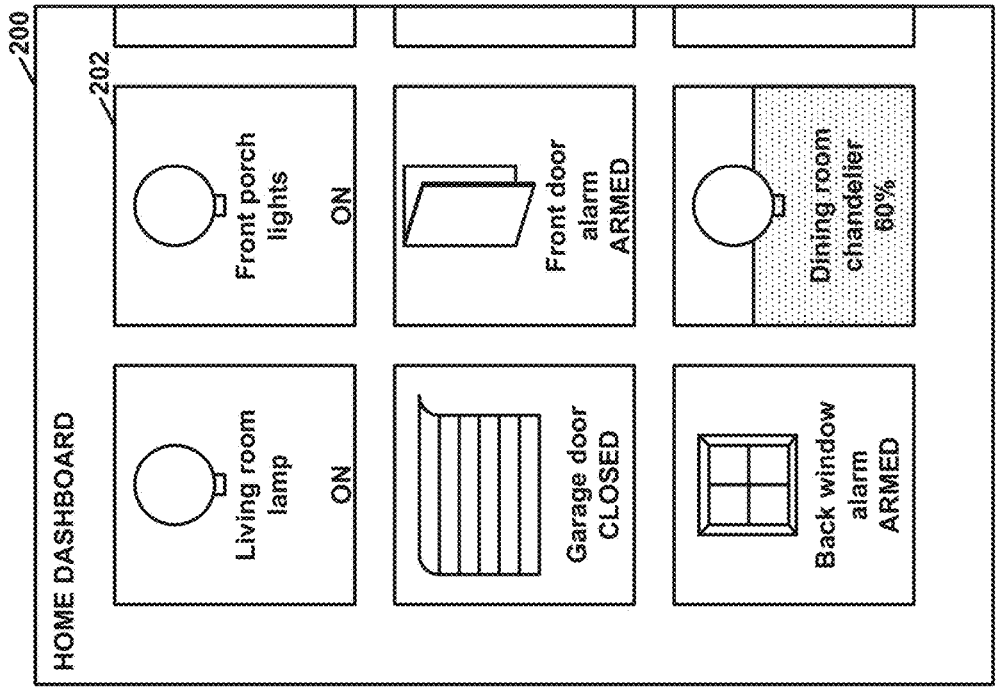
FIG. 5A is a conceptual diagram illustrating a selection of a tile in an example dashboard interface, in accordance with one or more techniques of this disclosure.

FIG. 5A is a conceptual diagram illustrating a selection of a tile in an example dashboard interface 200, in accordance with one or more techniques of this disclosure. As indicated above, client device 20 may output a command in response to receiving an indication of user interaction with a tile corresponding to the home automation device. In the example of FIG. 5A, client device 20 outputs dashboard interface 200 for display on a presence-sensitive display device, such as presence-sensitive display device 105 (FIG. 3). Furthermore, in the example of FIG. 5A, tile 202 corresponds to a set of front porch lights. In FIG. 5A, tile 202 indicates that the front porch lights are off. In the example of FIG. 5A, a user performs a tapping gesture on tile 202 to change the status of the front porch lights from off to on. Thus, client device 20 receives an indication of the tapping gesture on tile 202. In response to receiving the indication of the tapping gesture on tile 202, client device 20 sends (e.g., to server system 12) a command instructing the front porch lights to turn on.

Figure 5B:
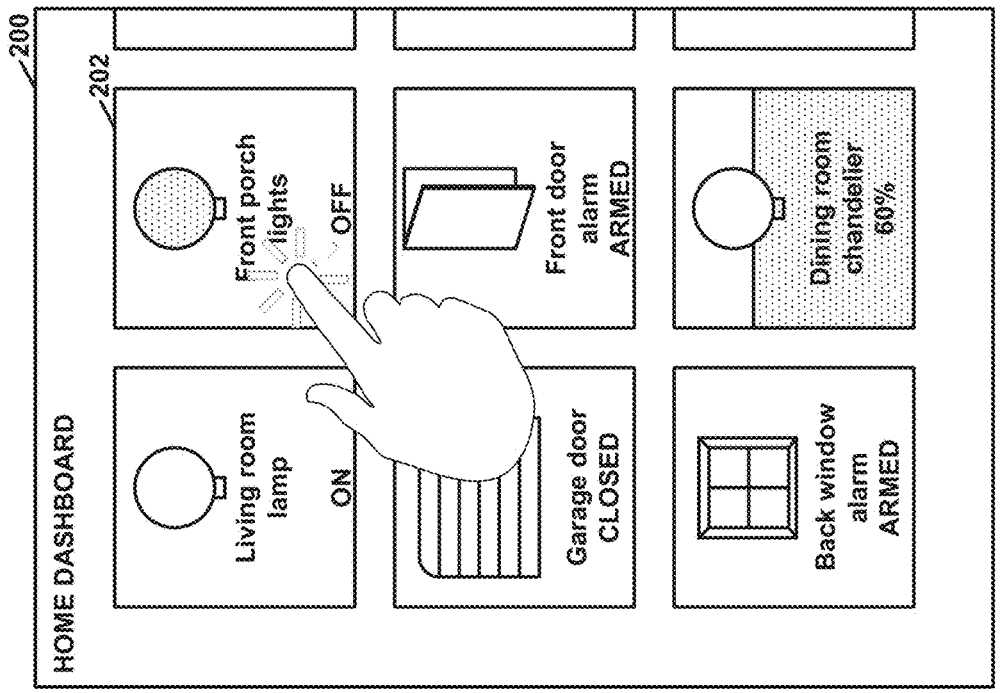
FIG. 5B is a conceptual diagram illustrating a result of the selection of the tile in the example dashboard interface of FIG. 5A, in accordance with one or more techniques of this disclosure.

FIG. 5B is a conceptual diagram illustrating a result of the selection of tile 202 in the example dashboard interface 200 of FIG. 5A, in accordance with one or more techniques of this disclosure. After client device 20 sends a command instructing the front porch lights to turn on, client device 20 may receive a response indicating whether the front porch lights were turned on successfully. As shown in the example of FIG. 5B, after client device 20 receives the indication that the front porch lights were turned on successfully, tile 202 indicates that the front porch lights are turned on.

Figure 6B:
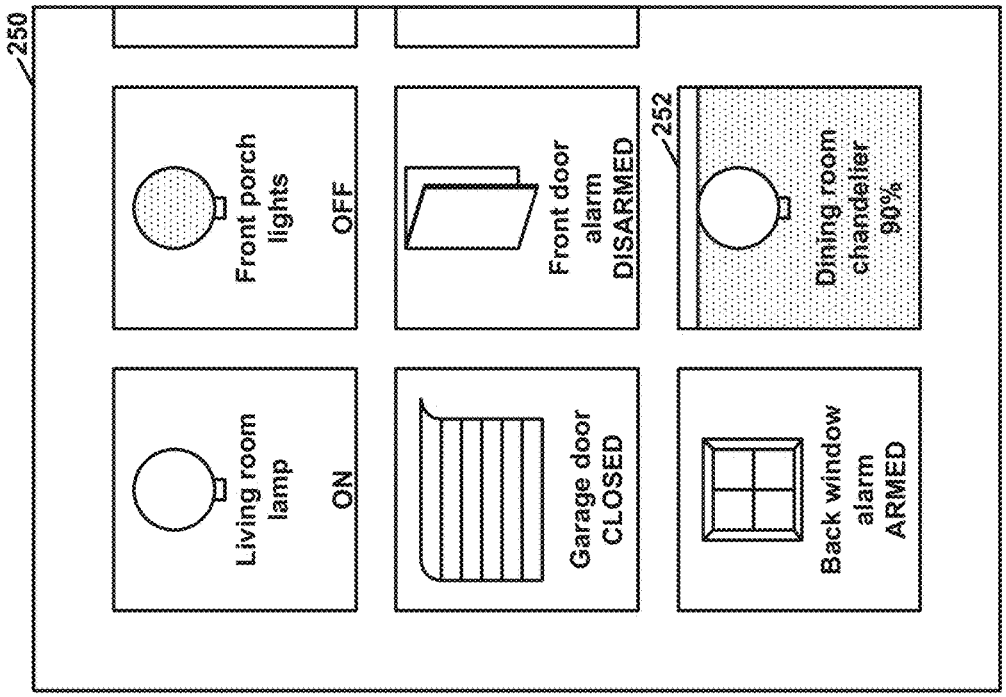
FIG. 6B is a conceptual diagram illustrating a result of the sliding adjustment of the tile in the example dashboard interface of FIG. 6B, in accordance with one or more techniques of this disclosure.
Figure 6A:
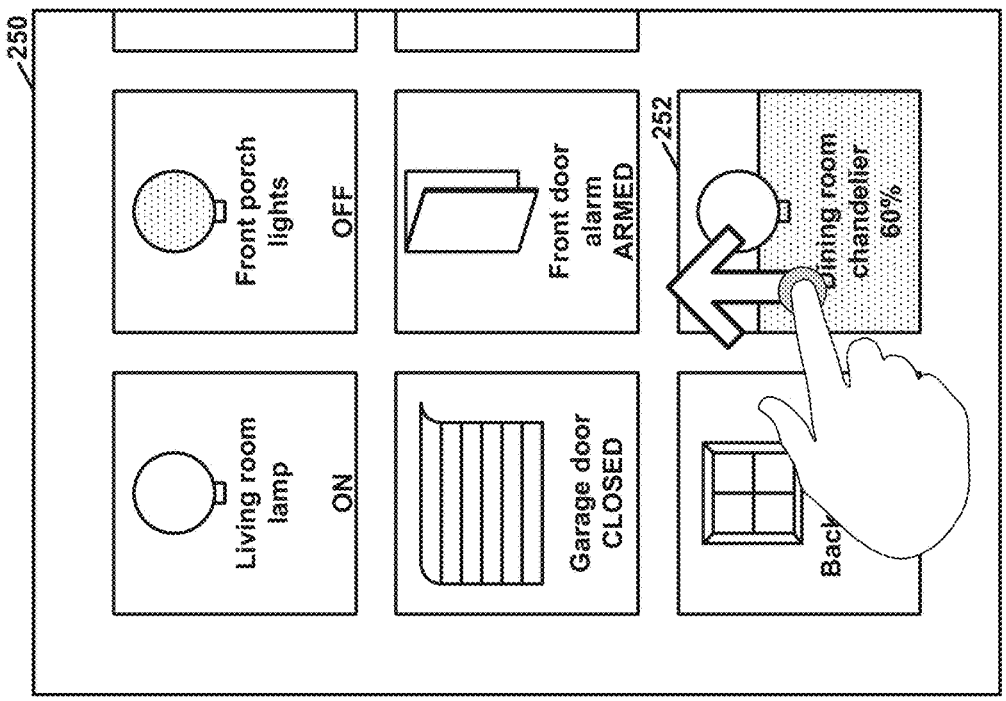
FIG. 6A is a conceptual diagram illustrating a sliding adjustment of a tile in an example dashboard interface, in accordance with one or more techniques of this disclosure.

FIG. 6A is a conceptual diagram illustrating a sliding adjustment of a tile 252 in an example dashboard interface 250, in accordance with one or more techniques of this disclosure. As indicated above, client device 20 may output a command to a home automation device in response to receiving an indication of user interaction with a tile corresponding to the home automation device. In the example of FIG. 5A, client device 20 outputs dashboard interface 200 for display on a presence-sensitive display device. Furthermore, in the example of FIG. 6A, tile 252 corresponds to a dining room chandelier equipped with a dimmer. In FIG. 6A, tile 252 indicates that the dimmer for the dining room chandelier is at 60%. In the example of FIG. 6A, a user performs a sliding gesture on tile 252 to change a status of the dimmer. For instance, the user may perform an upward sliding gesture to increase the output of the dimmer and may perform a downward sliding gesture to decrease the output of the dimmer. Thus, client device 20 may receive an indication of an upward or downward sliding gesture on tile 252. In response to receiving the indication of the sliding gesture on tile 252, client device 20 may send (e.g., to server system 12) a command instructing the dimmer for the dining room chandelier to increase or decrease output. The length or ending point of the sliding gesture may correspond to a target output level of the dimmer. For example, if the ending point of the sliding gesture corresponds to a point 90% of the way to the top of tile 252, client device 20 may interpret the sliding gesture as an instruction that the dimmer should have an output of 90%. In some examples, a user may completely turn off the dining room chandelier by performing a tapping gesture on tile 252.

FIG. 6B is a conceptual diagram illustrating a result of the sliding adjustment of tile 252 in the example dashboard interface 250 of FIG. 6B, in accordance with one or more techniques of this disclosure. After client device 20 sends a command instructing the dimmer of the dining room chandelier to increase output to 90%, client device 20 may receive data indicating whether the dimmer successfully increased output to 90%. As shown in the example of FIG. 6B, after client device 20 receives the indication that the dimmer has successfully increased output to 90%, tile 252 indicates that the output of the dimmer is 90%.

Figure 7:
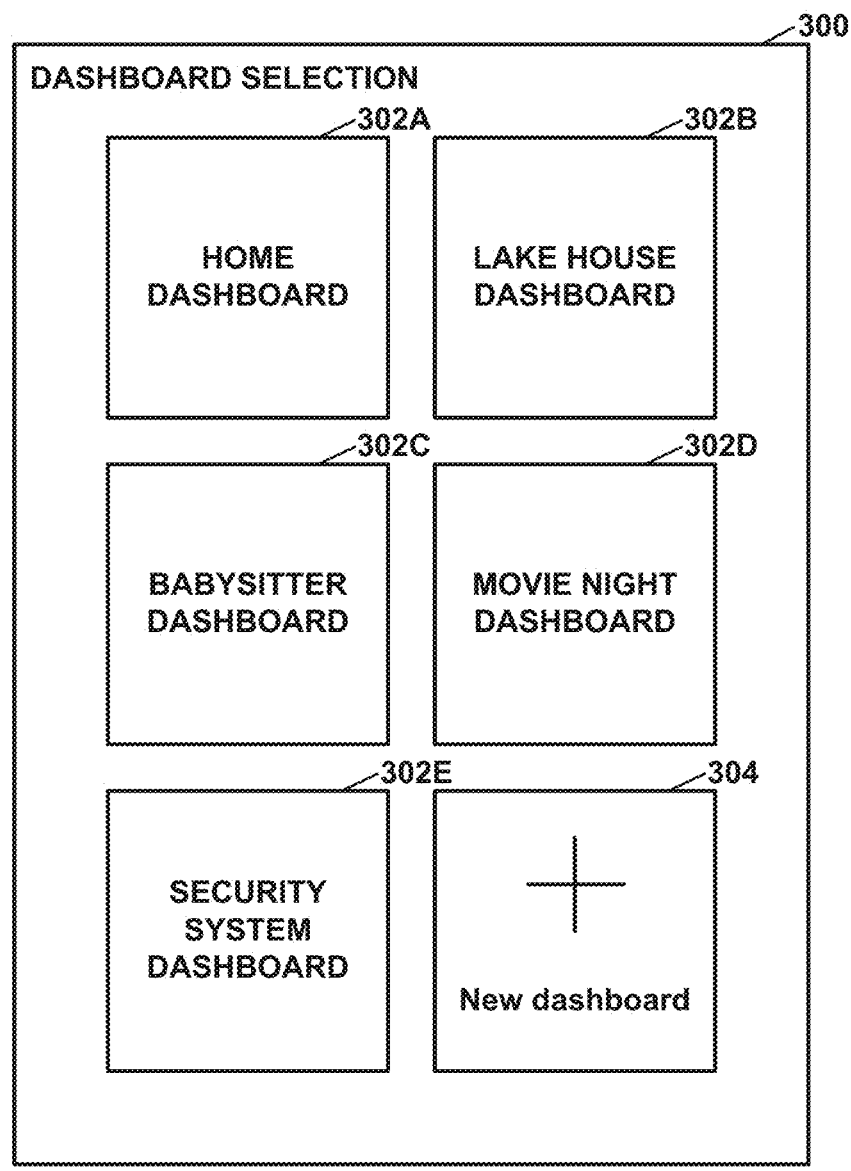
FIG. 7 is a conceptual diagram illustrating an example dashboard selection interface, in accordance with one or more techniques of this disclosure.

FIG. 7 is a conceptual diagram illustrating an example dashboard selection interface 300, in accordance with one or more techniques of this disclosure. As described elsewhere in this disclosure, a user may create multiple dashboard interfaces. In the example of FIG. 7, dashboard selection interface 300 includes tiles 302A-302E (collectively, "tiles 302"). Each of tiles 302 corresponds to a different respective dashboard interface. Client device 20 may output a particular dashboard interface for display in response to receiving an indication of user input to select the tile corresponding to the particular dashboard interface. For instance, client device 20 may output dashboard interface 150 of FIG. 4 for display in response to receiving an indication of user input (e.g., a tap or click gesture) to select tile 302A. In some examples, a user is able to rearrange tiles 302 in a similar manner to tiles in a dashboard interface.

In some examples, two or more dashboard interfaces do not include any tiles corresponding to the same home automation device. For instance, in the example of FIG. 7, the user may create a "home dashboard" that includes tiles corresponding to home automation devices located at the user's home. Furthermore, in the example of FIG. 7, the user may create a "lake house dashboard" that includes tiles corresponding to home automation devices located at the user's lake house. Accordingly, in the example of FIG. 7, dashboard selection interface 300 includes a tile 302A corresponding to the "home dashboard" interface and a tile 302B corresponding to the "lake house dashboard" interface.

In other examples, two or more of the dashboard interfaces include tiles corresponding to the same home automation device. Because a user may create two or more dashboard interfaces that include tiles corresponding to the same home automation device, the user may create customized dashboards for various purposes. For example, the user may create a "home dashboard" interface that includes tiles corresponding to each home automation device in the user's home. In this example, the user may want to grant a babysitter the ability to control some but not all home automation devices in the user's home. For instance, the user may want the babysitter to be able to lock and unlock a front door of the user's home, but the user may not want the babysitter to be able to enable or disable a security camera. Accordingly, the user may create a "babysitter dashboard" interface that includes tiles corresponding to a limited set of the home automation devices in the user's home. Hence, in the example of FIG. 7, dashboard selection interface 300 includes a tile 302C corresponding to the "babysitter dashboard" interface.

In another example, the user's home may have many home automation devices. Accordingly, when the user is performing particular tasks, it may be awkward to use one dashboard interface containing tiles corresponding to each to the home automation devices in the user's home. Hence, the user may create special-purpose dashboard interfaces for particular tasks. For instance, in the example of FIG. 7, the user may create a "movie night dashboard" interface that includes tiles corresponding to home automation devices related to a room on the user's home where the user likes to watch movies (e.g., dimmer switches, peripheral audio devices, etc.). Accordingly, the example of FIG. 7 includes a tile 302D corresponding to the "movie night dashboard" interface.

In a similar example, the user may have several home security related home automation devices and several home automation devices not related to home security. In this example, the user may want to quickly review and control the home automation devices related to home security. Accordingly, the user may create a security system dashboard that only includes tiles corresponding to the user's home security related home automation devices. Thus, the example of FIG. 7 includes a tile 302E corresponding to a "security system dashboard" interface.

In another example, the user may design dashboard interfaces for use on specific client devices or types of client devices. For example, the user may design a dashboard interface for use on the user's smartwatch. In this example, because of the small size of a smartwatch's display screen, the dashboard interface may only be able to display a single tile at a time. However, like the example dashboard of FIG. 4, the dashboard interface may be scrollable to reveal additional tiles. The user may be able to interact with tiles in the dashboard interface displayed by a smartwatch in much the same way that the user would be able to interact with tiles displayed by larger display devices. For instance, the user may be able to use tapping or sliding gestures to instruct home automation devices corresponding to tiles to perform particular actions. Displaying a dashboard on a smartwatch may be especially advantageous for locking and unlocking network-enabled door locks. Similar examples can be provided for other types of devices, such as televisions, tablet computers, smartphones, and so on.

In some examples, each of tiles 302 may comprise a graphical representation of the tiles in the dashboard interfaces corresponding to tiles 302. The graphical representation may comprise miniaturized version of the corresponding dashboard interface. For example, tile 302A may correspond to a dashboard interface having four tiles. In this example, tile 302A in dashboard selection interface 300 may include miniaturized versions of the four tiles. Including miniaturized versions of the tiles of dashboard interfaces in tiles 302 may help users quickly identify which of the dashboard interfaces the user wants to use.

Furthermore, in the example of FIG. 7, dashboard selection interface 300 includes a new dashboard tile 304. Client device 20 may output, for display, an interface for creating a new dashboard interface in response to receiving an indication of user selection of new dashboard tile 304.

Figure 8B:
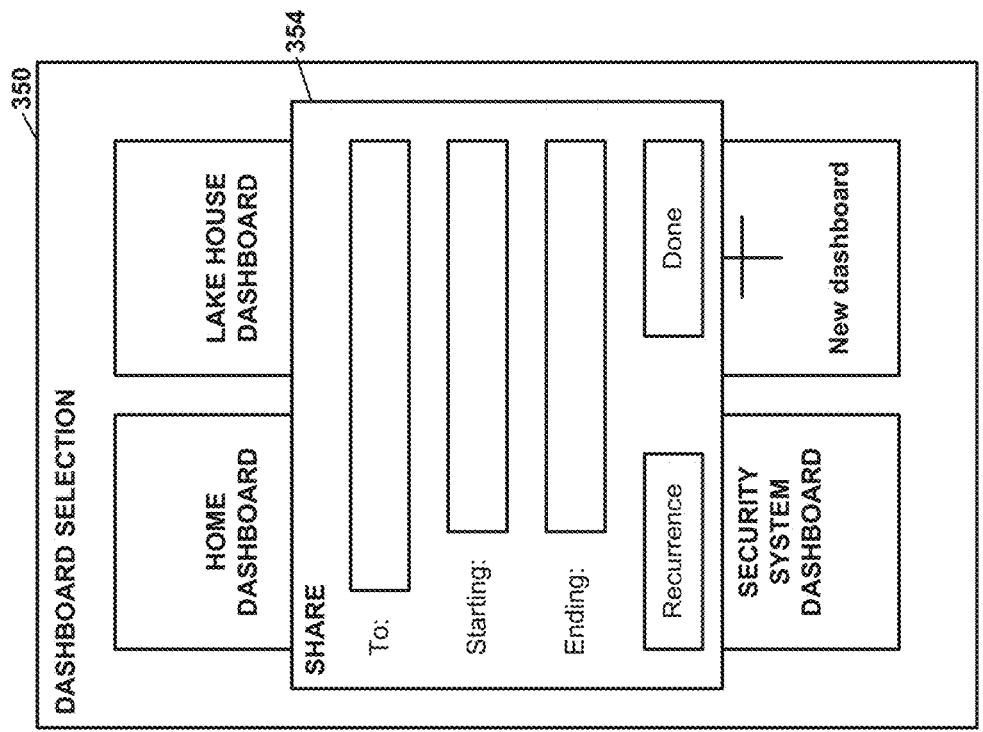
FIG. 8B is a conceptual diagram illustrating a result of the gesture on the example dashboard selection interface of FIG. 8A, in accordance with one or more techniques of this disclosure.
Figure 8A:
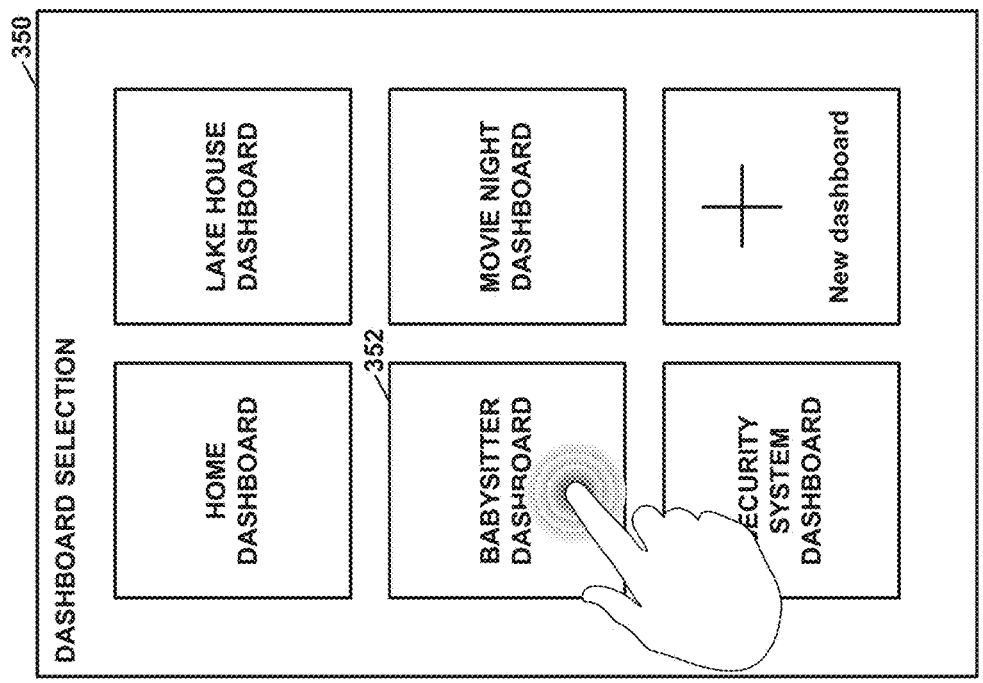
FIG. 8A is a conceptual diagram illustrating a gesture on an example dashboard selection interface, in accordance with one or more techniques of this disclosure.

FIG. 8A is a conceptual diagram illustrating a gesture on an example dashboard selection interface 350, in accordance with one or more techniques of this disclosure. As previously indicated, a user may create a dashboard interface for use by one or more other users. For instance, the user may create a dashboard interface for use by a babysitter. Accordingly, the user may share a dashboard interface with another user, thereby making the dashboard interface available for use by the other user. When the user makes a particular dashboard interface available for use by another user, the user does not necessarily make the user's other dashboards available for use by the other user. For instance, if the user shares the "babysitter dashboard" interface with the babysitter, the "home dashboard" interface and "lake house dashboard" interface are not necessarily available for use by the babysitter.

Furthermore, when a user shares a dashboard interface with another user, the user may limit when the other user is able to use the dashboard interface. For example, the user may enable the other user to use the shared dashboard interface only between 7:00 pm and 12:00 pm on April 12.

In the example of FIG. 8A, client device 20 may receive an indication of user input to output a sharing interface. In the example of FIG. 8A, the indication of user input to output the sharing interface comprises a long tap gesture on a tile corresponding to a dashboard interface. The sharing interface includes user input elements that enable a user to specify users with whom a dashboard interface is shared and user input elements that enable the user to specify temporal conditions. The temporal conditions specify when a user with whom the dashboard interface is shared is able to use the dashboard.

FIG. 8B is a conceptual diagram illustrating a result of the gesture on example dashboard selection interface 350 of FIG. 8A, in accordance with one or more techniques of this disclosure. The example of FIG. 8B includes a sharing interface 354 overlaid on dashboard selection interface 350. Sharing interface 354 includes a "to" field, a "starting" field, and an "ending" field. Client device 20 may receive an indication of a user which whom to share a dashboard interface in the "to" field of sharing interface 354. Client device 20 may receive, in the "starting" field of sharing interface 354, an indication of a time at which the user with whom the dashboard interface is shared is able to start using the dashboard interface. Client device 20 may receive, in the "ending" field, of sharing interface 354, an indication of a time at which the user with whom the dashboard interface is shared is no longer able to use the dashboard interface. This is one example way of client device 20 receiving one or more indications of user input specifying a time interval during which the second user is allowed to use the user interface to monitor and control a plurality of home automation devices. In some examples, the time interval is open-ended at a future end.

In some examples, responsive to receiving an indication of user input to share a dashboard interface with another user, client device 20 sends dashboard sharing data to server system 12. The dashboard sharing data may specify a user (or group of users) with whom a dashboard interface is shared. Additionally, the dashboard sharing data may specify temporal conditions on the sharing of the dashboard. In some examples, the dashboard sharing data may also specify access rights for the user or group of users. The access rights of a user or group of users may control whether the user or group of user is able to see, use, and/or edit the dashboard.

Responsive to receiving the dashboard sharing database, server system 12 (e.g., user interface module 56 of server system 56) may store (e.g., in dashboard database) data indicating the user (or group of users) with whom the dashboard interface is shared and temporal conditions on the sharing of the dashboard interface with the user or group of users.

In some examples, when a dashboard interface is shared with a user, server system 12 sends a notification to the user. In various examples, the notification may have various forms. For example, the notification may comprise an email message, an instant message, an SMS message, an application notification message, and so on. In some examples, if the user with whom the dashboard interface is shared already has a device management application (e.g., device management application module 116 of FIG. 3) installed, the device management application may present the notification to the user.

The notification may alert the user that the dashboard interface has been shared with the user. In one example, the notification prompts the user to download and install a device management application (e.g., device management application module 116 of FIG. 3) on the user's client device. In this example, the notification may comprise an email message that includes a link to the device management application. In some examples, a web browser application on the user's client device presents the dashboard interface in a webpage. In this example, the notification may include a link to the webpage.

Server system 12 may control access to dashboard interfaces in various ways. For instance, in one example, server system 12 requires users to establish accounts. In this example, prior to providing a user with access to a dashboard interface, server system 12 may require the user to log-in to server system 12 using an account. Logging-in to server system 12 using an account may involve client device 20 providing user authentication credentials associated with the account to server system 12.

Figure 9:
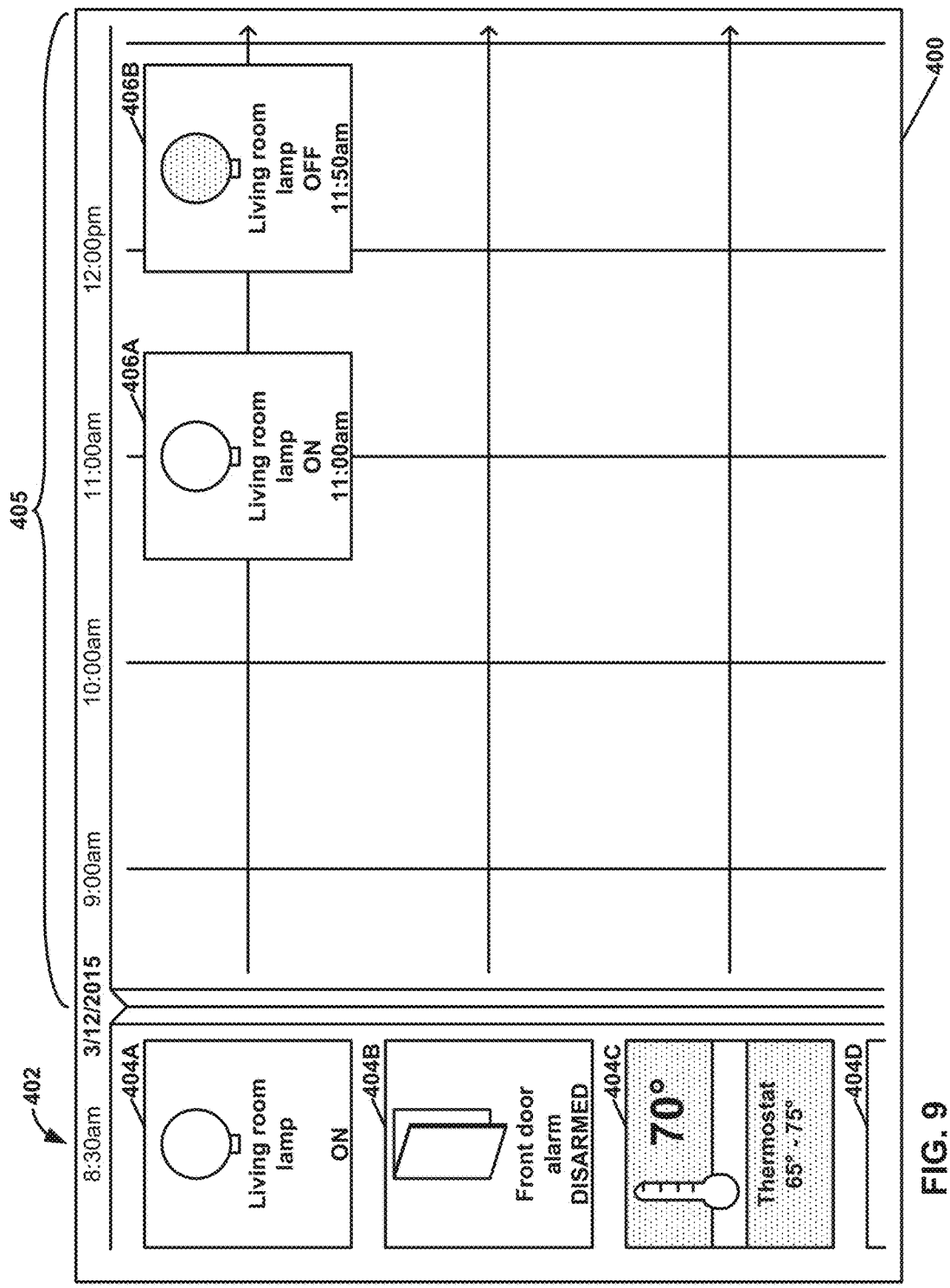
FIG. 9 is a conceptual diagram illustrating an example timeline interface, in accordance with one or more techniques of this disclosure.

FIG. 9 is a conceptual diagram illustrating an example timeline interface 400, in accordance with one or more techniques of this disclosure. Client device 20 may output timeline interface 400 for display. Timeline interface 400 may enable a user to schedule events involving home automation devices 22. In the example of FIG. 9, timeline interface 400 includes a home column 402. Home column 402 includes one or more current event tiles. In the example of FIG. 9, home column 402 includes current event tiles 404A, 404B, 404C, 404D (collectively, "current event tiles 404"). Each of current event tiles 404 corresponds to one or more of home automation devices 22. A user can use current event tiles 404 in home column 402 to control corresponding home automation devices in the same way that the user would use tiles in a dashboard interface to control corresponding home automation devices. In some examples, one or more of current event tiles 404 indicate statuses of corresponding home automation devices. For example, current event tile 404A indicates that a living room lamp is currently on, current event tile 404B indicates that a front door alarm is currently disarmed, and current event tile 404C indicates that a current temperature measured by a thermostat is currently 70°.

Furthermore, timeline interface 400 includes a staging area 405. Different positions in staging area 405 along an axis correspond to different times in the future. In the example of FIG. 9, the axis is horizontal. In other examples, the axis may be vertical or diagonal. Accordingly, staging area 405 includes data specifying future time and date values corresponding to positions in staging area 405. In response to receiving an indication of user input to do so, client device 20 may position, within staging area 405 of timeline interface 400, a future event tile at a location corresponding to a future time. In the example of FIG. 9, timeline interface 400 includes future event tiles 406A and 406B (collectively, "future event tiles 406"). Although the example of FIG. 9 shows future event tiles 406 as comprising boxes with text and an icon (e.g., a light bulb), in other examples, a future event tile may simply comprise an icon, possibly with an accompanying label and status information.

Each of future event tiles 406 corresponds to one or more of home automation devices 22. For each respective future event tile, the respective future event tile is in the same row of timeline interface 400 as a tile in home column 402 corresponding to the same one or more home automation devices as the respective future event tile. For instance, in the example of FIG. 9, future event tile 406A, future event tile 406B, and current event tile 404A all correspond to the same living room lamp. If a future event tile corresponds to the same one or more home automation devices as a current event tile, the future event tile corresponds to the current event tile and the current event tile corresponds to the future event tile.

A user may use a future event tile in much the same way that the user would use a current event tile or a tile in a dashboard interface. For example, the user may tap or select a future event tile 406A in order to turn the living room lamp on or off. However, rather than the corresponding home automation device immediately performing the action, the corresponding home automation device performs the action at the time corresponding to the future event tile. For instance, in the example of FIG. 9, future event tile 406A corresponds to the living room lamp turning on at 11:00 am on Mar. 12, 2015. Future event tile 406B corresponds to the living room lamp turning off at 11:50 am on Mar. 12, 2015. Thus, if the user does not modify timeline interface 400, the living room lamp will turn on at 11:00 am on Mar. 12, 2015 and turn off at 11:50 am on Mar. 12, 2015. Thus, in some examples, client device 20 may receive an indication of a user input targeted at a future event tile. In such examples, responsive to receiving the indication of the user input, client device 20 may update the target status of a parameter of a home automation device.

In some examples, client device 20 receives an indication of user input to modify a parameter of a home automation device corresponding to a future event tile, client device 20 may send rule data to server system 12. The rule data instructs server system 12 to send, at or close to the time corresponding to the future event tile, a command instructing the home automation device to modify the parameter of the home automation device. For instance, in the example of FIG. 9, at or close to 11:00 am on Mar. 12, 2015, server system 12 may send a command instructing the living room lamp to turn on.

In some examples, a home automation device has an internal clock and is configured to modify particular parameters based on the current time. In this example, the home automation device may receive a command instructing the home automation device to modify a particular parameter at a particular time. For instance, in the example of FIG. 9, server system 12 or client device 20 may send, prior to 11:00 am on Mar. 12, 2015, data indicating a command that instructs the living room lamp to turn on at 11:00 am on Mar. 12, 2015.

In response to an indication of user input, client device 20 may scroll timeline interface 400 vertically to reveal additional rows for additional current event tiles, such as a row for partially obscured current event tile 404D. In some examples, client device 20 may scroll timeline interface 400 vertically in response to an upward or downward dragging gesture starting in a portion of timeline interface 400 not occupied by a current or future event tile that accepts its own vertical sliding gestures.

Furthermore, in response to an indication of user input, client device 20 may scroll timeline interface 400 horizontally to reveal additional columns for additional times and dates. For instance, in the example of FIG. 9, timeline interface 400 displays locations corresponding to a time period ranging from approximately 9:00 am to 1:00 pm on Mar. 12, 2015. In response to an indication of user input, client device 20 may scroll timeline interface 400 such that timeline interface 400 displays locations corresponding to a time period ranging from 12:00 pm to 5:00 pm on Mar. 12, 2015. In some examples, when client device 20 scrolls timeline interface 400 horizontally, home column 402 may remain in the same place. As client device 20 scrolls timeline interface 400 horizontally or vertically, client device 20 may reveal more future event tiles in timeline interface 400.

In some examples, client device 20 changes the granularity of times indicated in timeline interface 400 in response to receiving an indication of a pinching gesture or other user input. Thus, in some examples, rather than each column of timeline interface 400 corresponding to one hour as shown in the example of FIG. 9, each column of timeline interface 400 may correspond to two hours or 30 minutes.

Figure 10A:
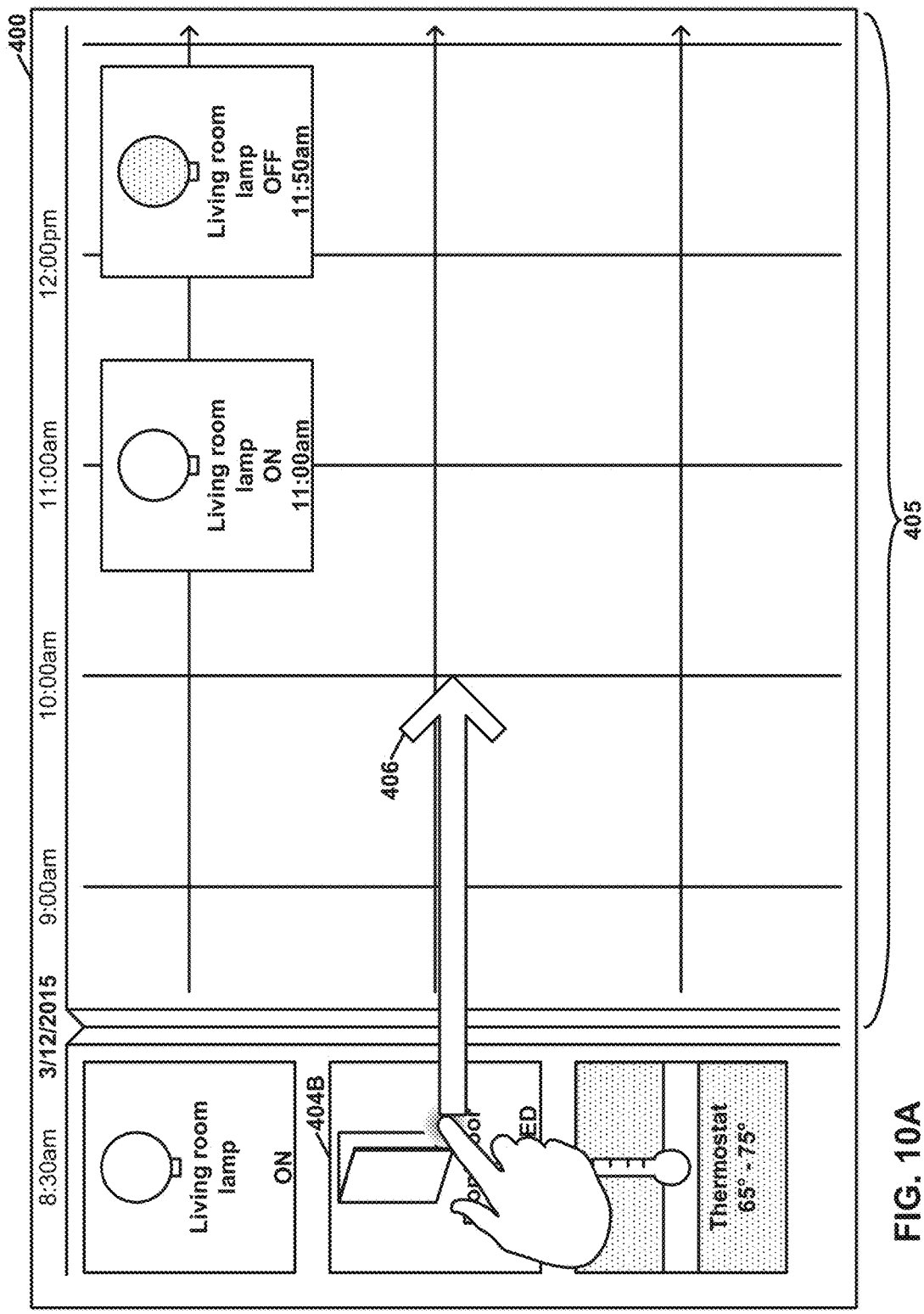
FIG. 10A is a conceptual diagram illustrating an example gesture to add a future event tile in a timeline interface, in accordance with one or more techniques of this disclosure.

FIG. 10A is a conceptual diagram illustrating an example gesture to add a future event tile in timeline interface 400, in accordance with one or more techniques of this disclosure. As indicated above, client device 20 may add a future event tile to timeline interface 400 in response to user input. In some examples, client device 20 may add a future event tile corresponding to a current event tile and a particular future time in response to receiving an indication of a dragging gesture originating at the current event tile and terminating at a location in timeline interface 400 corresponding to the particular future time.

Figure 10B:
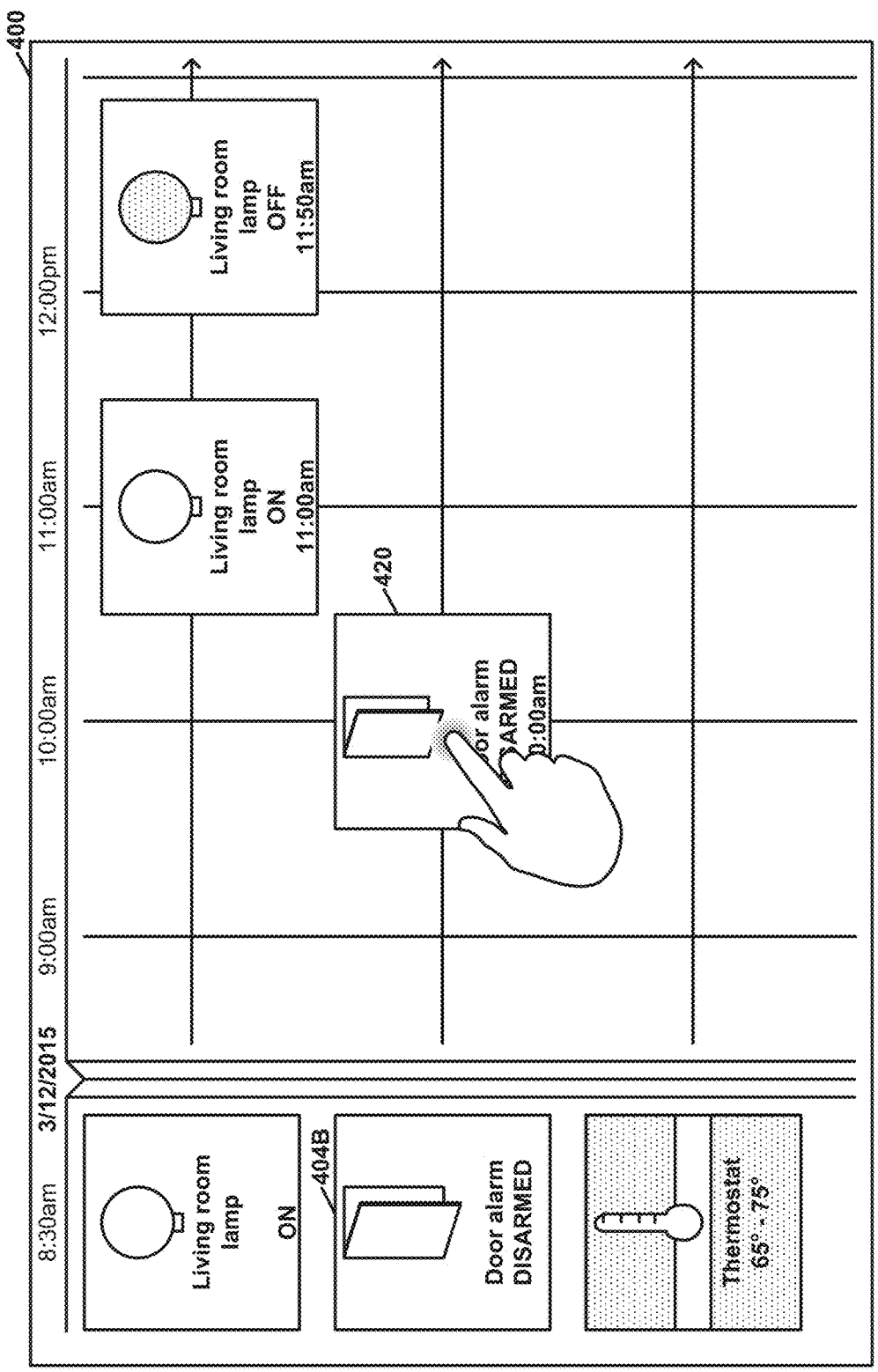
FIG. 10B is a conceptual diagram illustrating a result of the example gesture to add the future event tile in the timeline interface of FIG. 10A, in accordance with one or more techniques of this disclosure.

For instance, in the example of FIG. 10A, client device 20 may add a future event tile corresponding to current event tile 404B in response to receiving an indication of a dragging gesture 406 originating at current event tile 404B. FIG. 10B is a conceptual diagram illustrating a result of the example gesture 406 to add the future event tile in timeline interface 400 of FIG. 10A, in accordance with one or more techniques of this disclosure. As shown in the example of FIG. 10B, timeline interface 400 now includes a future event tile 420 corresponding to current event tile 404B. In this way, client device 20 may receive an indication of a dragging gesture originating at a location within timeline interface 400 corresponding to a current event tile and terminating at a location within staging area 405 of timeline interface 400 corresponding to the particular time.

When client device 20 adds a future event tile in the manner described with regard to FIG. 10A and FIG. 10B, the future event tile may inherit a current status of parameters of home automation devices corresponding to the current event tile. For instance, in the example of FIG. 10B, current event tile 404B indicates that a door alarm is disarmed. Accordingly, future event tile 420 indicates that the door alarm is to be disarmed at a future time. As described above, the user can interact with future event tile 420 to instruct the one or more home automation devices corresponding to future event tile 420 to perform different actions at the future time.

In another example, client device 20 adds a future event tile corresponding to a current event tile and a particular future time in response to receiving an indication of a tapping gesture at a portion in timeline interface 400 aligned (e.g., horizontally or vertically) with the current event tile and corresponding to the particular future time. For instance, in the example of FIG. 10, client device 20 may add the future event tile corresponding to current event tile 404B and the time 10:00 am in response to receiving an indication of a tapping gesture at a location right of current event tile 404B and at a point corresponding to 10:00 am (e.g., a point at a tip of the arrow shown in FIG. 10A).

Figure 11B:
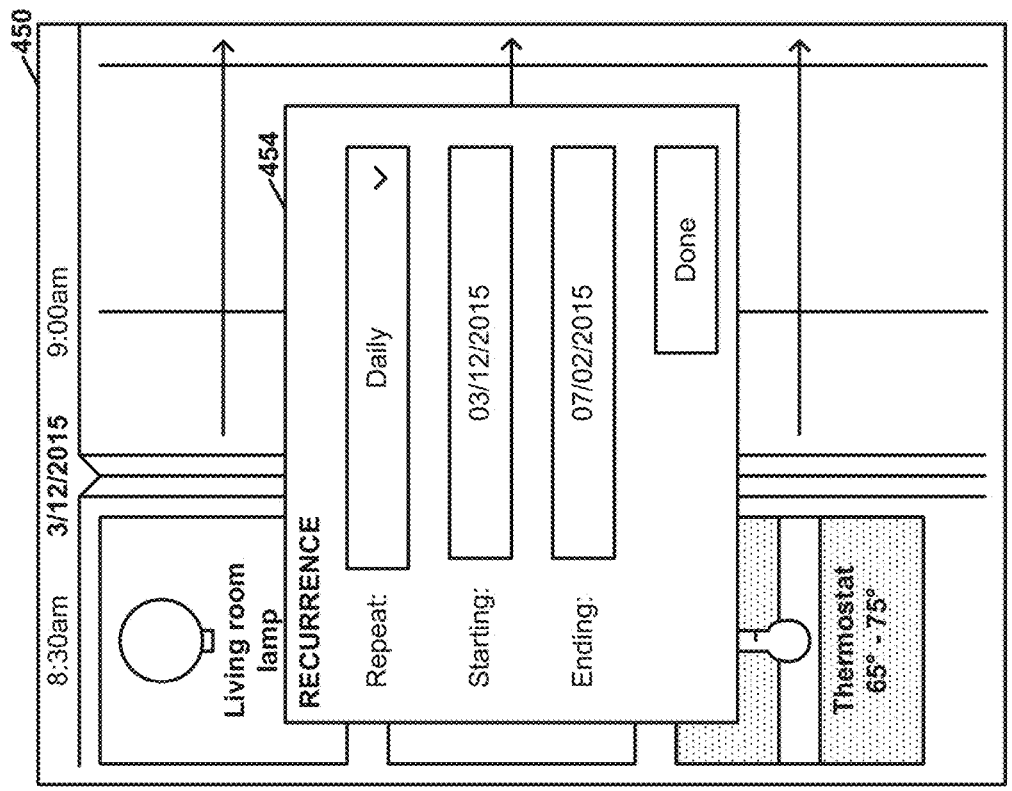
FIG. 11B is a conceptual diagram illustrating an example recurrence configuration interface for a future event tile in the timeline interface of FIG. 11A, in accordance with one or more techniques of this disclosure.
Figure 11A:
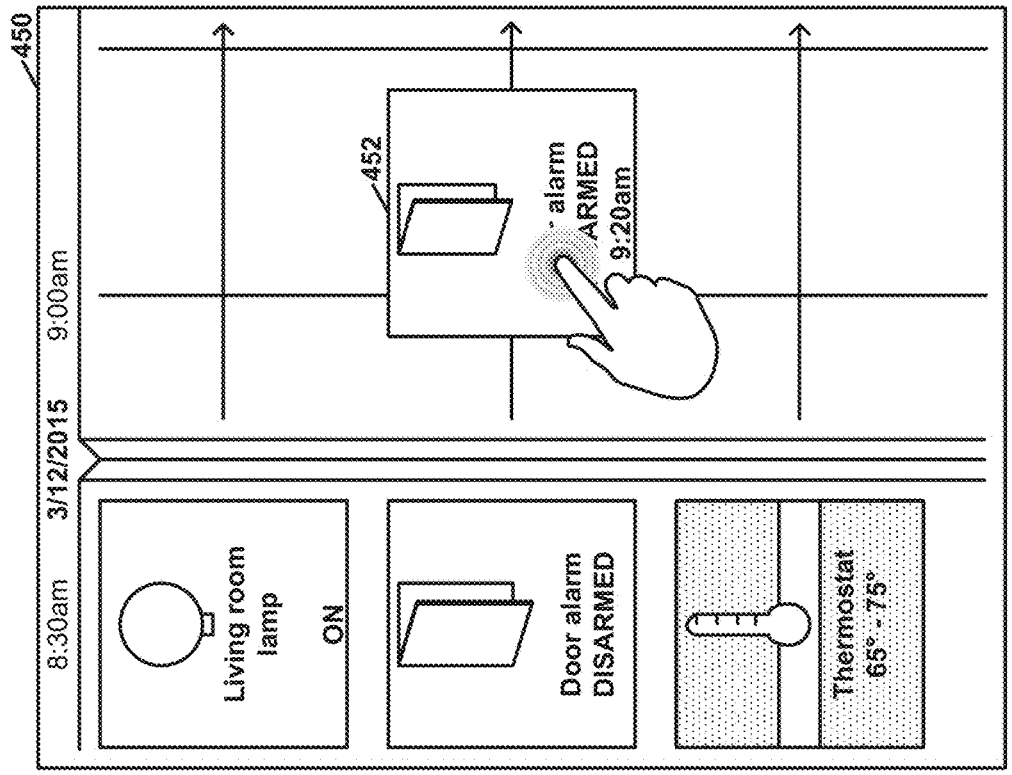
FIG. 11A is a conceptual diagram illustrating an example gesture to open a recurrence configuration interface for a future event tile in a timeline interface, in accordance with one or more techniques of this disclosure.

FIG. 11A is a conceptual diagram illustrating an example gesture to open a recurrence configuration interface for a future event tile 450 in a timeline interface, in accordance with one or more techniques of this disclosure. A user may wish to have an event corresponding to a future event tile recur on a periodic basis. For instance, in the example of FIG. 11A, a future event tile 452 corresponds to a door alarm being disarmed at 9:20 am on Mar. 12, 2015. In this example, a user may wish the door alarm to disarm itself every day at 9:20 am.

To facilitate the recurrence of an event on a periodic basis, client device 20 may output a recurrence configuration interface in response to a receiving an indication of user input. In the example of FIG. 11A and FIG. 11B, client device 20 may output a recurrence configuration interface 454 in response to receiving an indication of a long touch gesture at a location of timeline interface 450 corresponding to future event tile 452. Thus, FIG. 11B is a conceptual diagram illustrating an example recurrence configuration interface for future event tile 452 in timeline interface 450 of FIG. 11A, in accordance with one or more techniques of this disclosure.

The recurrence configuration interface includes user interface features that enable the user to set parameters for a recurrence pattern of an event. In the example of FIG. 11B, recurrence configuration interface 454 includes a drop-down box for selection of a recurrence frequency of the recurrence pattern, a text box for entry of a starting time of the recurrence pattern, and a text box for entry of an ending time of the recurrence pattern. Other example recurrence configuration interfaces may include difference user interface features for entry of a recurrence pattern.

When client device 20 receives input of a recurrence pattern in recurrence configuration interface 454, client device 20 may send rule data to server system 12. As indicated above, the rule data may indicate a condition-action rule that specifies that an event is to occur when one or more criteria are specified. In this case, the criteria comprise the recurrence pattern. Responsive to the rule data, server system 12 may include the condition-action rule in rule base 50. In some examples, the rule data sent by client device 22 does not explicitly specify a condition-action rule. Rather, in such examples, server system 12 determine the condition-action rule based on the rule data.

Figure 12:
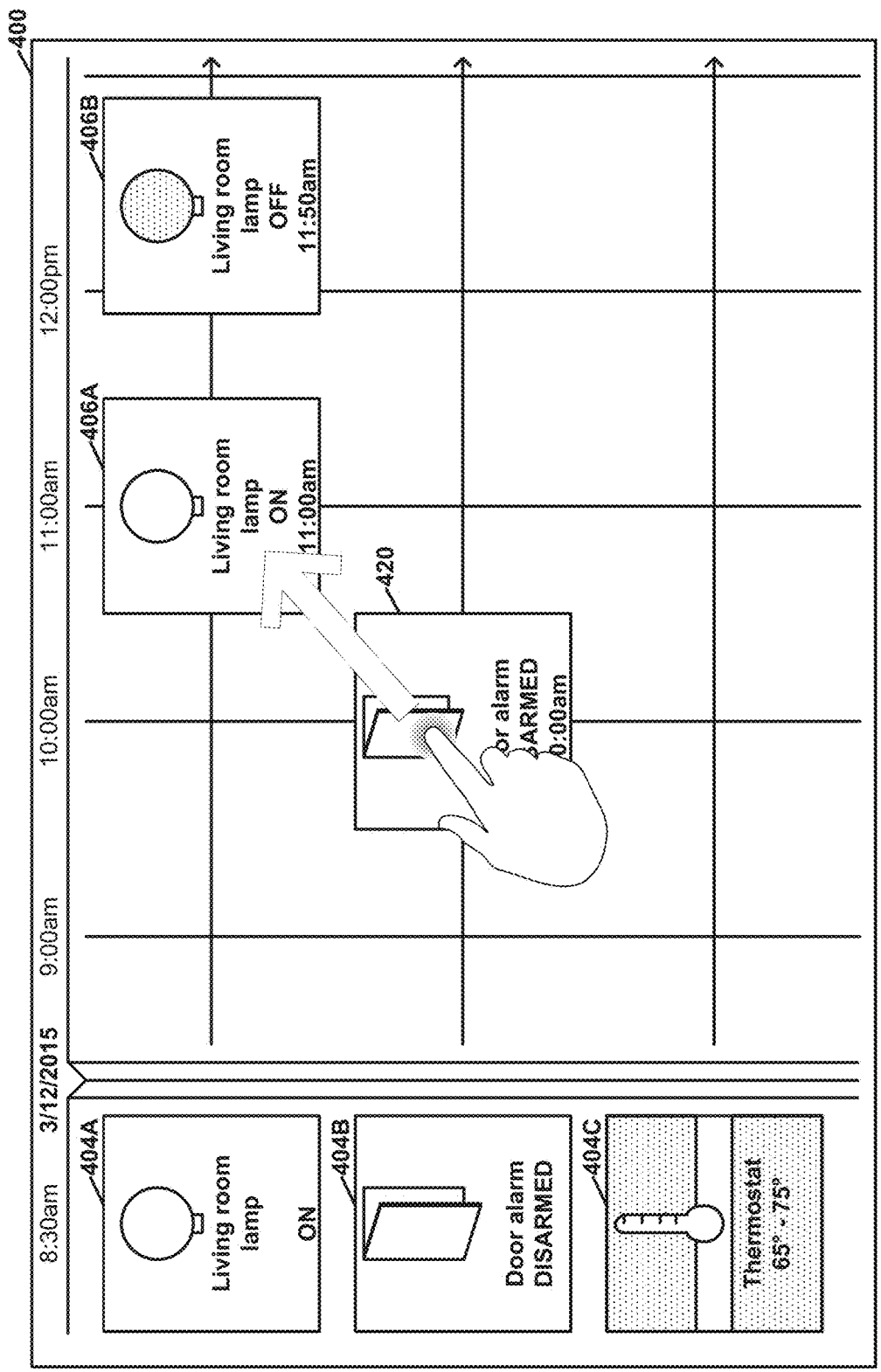
FIG. 12 is a conceptual diagram illustrating an example gesture to synchronize recurrence patterns between two future event tiles, in accordance with one or more techniques of this disclosure.

FIG. 12 is a conceptual diagram illustrating an example gesture to synchronize recurrence patterns between two future event tiles in timeline interface 400, in accordance with one or more techniques of this disclosure. In many instances, a user may want a future event tile to have the same recurrence pattern as another future event tile. Accordingly, in some examples, client device 20 may set the recurrence pattern of a first future event tile to match the recurrence pattern of a second future event tile in response to receiving an indication of user input of a dragging gesture from a location of the first future event tile to a location of the second future event tile.

Copying recurrence patterns from future event tile to future event tile in this manner may make it easier for the user to synchronize events occurring on multiple home automation devices. For example, the user may typically return home from work at 5:30 pm. Accordingly, in this example, the user may set a recurrence pattern on an entryway lamp, such that the entryway lamp turns on every weekday at 5:30 pm. Furthermore, in this example, the user may want a front porch lamp to turn every weekday at 5:30 pm. Accordingly, rather than using a recurrence configuration interface, such as recurrence configuration interface 454 of FIG. 11B, the user may simply slide a future event tile corresponding to the front porch lamp to the future event tile corresponding to the entryway lamp, thereby configuring the front porch lamp to recur every weekday at 5:30 pm.

In the example of FIG. 12, future event tile 406A may have a recurrence pattern in which a living room lamp turns on at 11:00 am every Monday, Wednesday, and Friday. In this example, the user may want a door alarm to disarm itself at 10:00 am every Monday, Wednesday, and Friday. Accordingly, the user positions a future event tile 420 corresponding to the door alarm at a location in timeline interface 400 corresponding to 10:00 am. The user may then perform a dragging gesture from future event tile 420 to future event tile 406A. Thus, client device 20 may receive an indication of user input to position future event tile 420 at the location corresponding to 10:00 am and further may receive an indication of user input of dragging gesture from a location of timeline interface 400 corresponding to future event tile 420 to a location of timeline interface 400 corresponding to future event tile 406A. After the receiving the indication of the dragging gesture, client device 20 may return future event tile 420 to its location within timeline interface 400 prior to the dragging gesture.

Responsive to client device 20 receiving an indication of user input to set the recurrence pattern of a first future event tile to a recurrence pattern of a second future event tile, client device 20 may send rule data to server system 12. Responsive to the rule data, server system 12 may store a condition-action rule in rule base 50. The condition-action rule specifies that the event specified by the first future event tile is to occur in accordance with the recurrence pattern.

Figure 13:
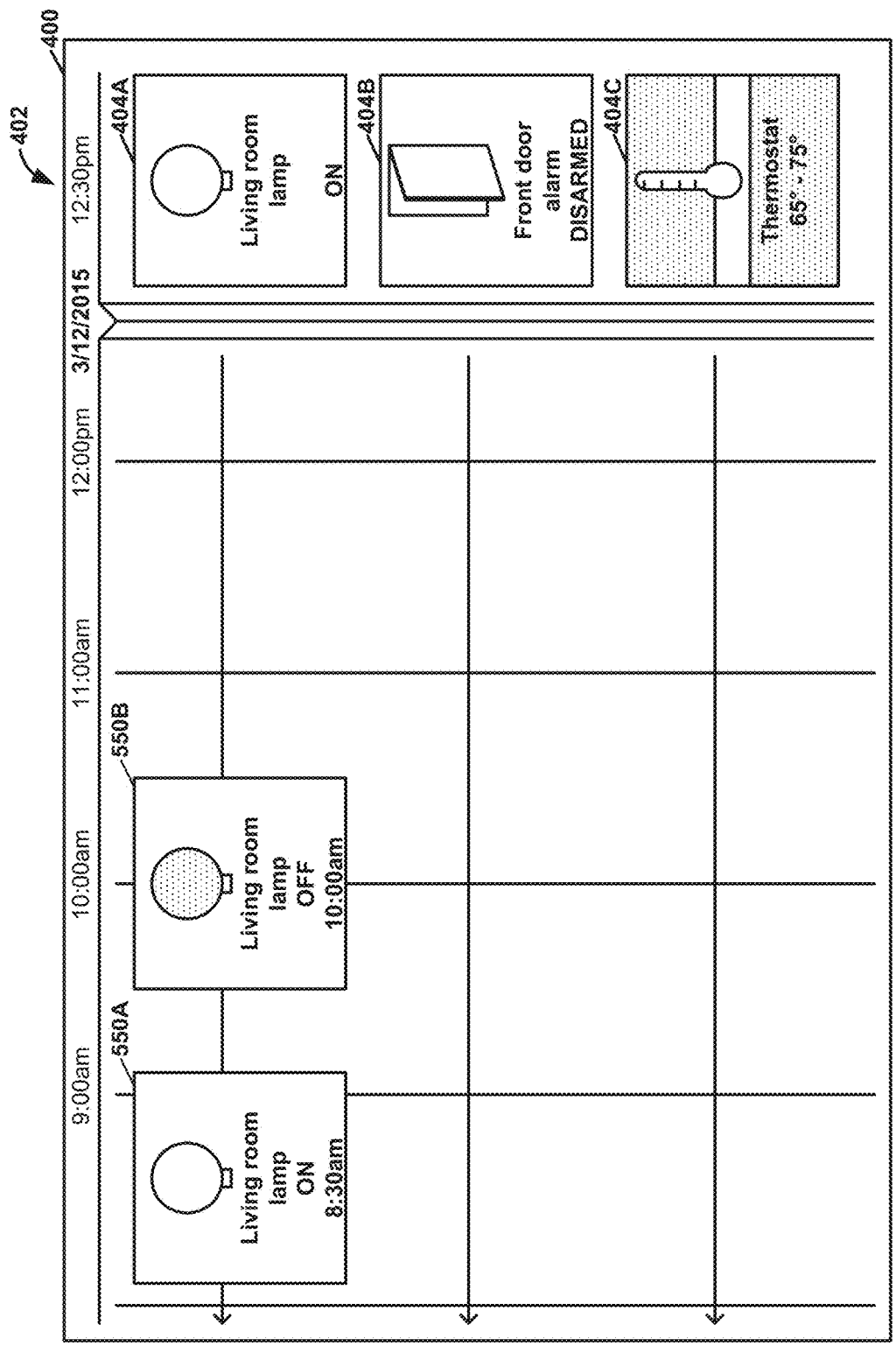
FIG. 13 is a conceptual diagram illustrating an example timeline interface showing past event tiles, in accordance with one or more techniques of this disclosure.

FIG. 13 is a conceptual diagram illustrating an example timeline interface 400 showing past event tiles, in accordance with one or more techniques of this disclosure. A user of client device 20 may wish to review past events performed by home automation devices. Accordingly, client device 20 may output timeline interface 400 for display such that timeline interface 400 includes columns corresponding to times in the past. Furthermore, timeline interface 400 may include past event tiles. Each of the past event tiles corresponds to a current event tile in home column 402 and corresponds to a time in the past. In some examples, a past event tile may include information describing an event corresponding to the past event tile.

In the example of FIG. 13, the current time is 12:30 pm on Mar. 12, 2015. FIG. 13 includes a past event tile 550A and a past event tile 550B. Past event tile 550A indicates that a living room lamp turned on at 8:30 am on Mar. 12, 2015. Past event tile 550B indicates that the same living room lamp turned off at 10:00 am on Mar. 12, 2015.

In some instances, a past event tile corresponds to an event that was scheduled using a future event tile in timeline interface 400. Thus, conceptually, a future event tile may become a past event tile when the time associated with the future event tile has passed. In some instances, a past event tile may correspond to an unscheduled event. In the example of FIG. 13, a user may manually turn the living room lamp on at 8:30 am and/or manually turn the living room lamp off at 10:00 am.

Client device 20 may output the past event tiles based on data received from server system 12. For example, client device 20 may receive, from server system 12, data indicating an occurrence of an event at a home automation device. Furthermore, client device 20 may output, for display, a past event tile at a location within a user interface (e.g., the timeline interface) corresponding to a time at which the event occurred. Similarly, server system 12 may receive a set of event data indicating an occurrence of an event at the home automation device. Furthermore, server system 12 may send, to client device 20, data enabling client device 20 to output a past event tile at a location within the user interface corresponding to a time at which the event occurred. The past event tile indicates the occurrence of the event at the home automation device. In some examples, the past event tile is aligned with the current event tile corresponding to the home automation device.

Client device 20 may output a recurrence configuration interface in response to an indication of user input directed to a past event tile. The recurrence configuration interface may enable the user to set a recurrence pattern for future event tiles based on the event and time of the past event tile. In this way, the past event tile may become associated with a recurrence pattern. In the example of FIG. 13, client device 20 may receive an indication on a long press gesture on past event tile 550A. Accordingly, client device 20 may output a recurrence configuration interface for display. The user may use the recurrence configuration interface to create future event tiles corresponding to the living room lamp turning on every weekday at 8:30 am. If a past event tile corresponds to an event that was scheduled as part of a recurrence pattern, the past event tile is already associated with the recurrence pattern.

Furthermore, in some examples, the user may set a recurrence pattern for future event tiles based on a first past event tile by performing a dragging gesture from the first past event tile to a second past event tile associated with a recurrence pattern. In the example of FIG. 13, past event tile 550A may be associated with a recurrence pattern in which the living room lamp turns on at 8:30 am every weekday. In this example, the user may establish a pattern of the living room lamp turning off at 10:00 am every weekday by performing a dragging gesture from past event tile 550B to past event tile 550A. This may enable the user to easily generate recurrence patterns for groups of home automation devices based on past events.

Responsive to client device 20 receiving an indication of user input to set the recurrence pattern of a first past event tile to a recurrence pattern of a second past event tile, client device 20 may send rule data to server system 12. Responsive to the rule data, server system 12 may store a condition-action rule in rule base 50. The condition-action rule specifies that the event specified by the first past event tile is to occur in accordance with the recurrence pattern.

In some examples, current event tiles 404 may include one or more tiles corresponding to services. Examples of such services include real world (e.g., non-information) services. For example, such services may include car services, laundry services, housekeeping services, food delivery or pickup services, and so on. Responsive to an indication of user input directed to a current event tile corresponding to a service, client device 20 may output a command requesting a service provider provide the service. For instance, responsive to an indication of user input directed to a current event tile corresponding to a car service, client device 20 may output a command summoning a car.

Furthermore, the user may create and use future event tiles in timeline interface 400 corresponding to services in much the same way that the user may create and use future event tiles corresponding to home automation devices. For example, a user may schedule pickup by a car service by positioning a future event tile at a location in timeline interface 400 corresponding to the time at which the user wishes to be picked up by the car service.

The user may configure recurrence patterns and other rules using future event tiles corresponding to services in the same way as this user would be able to configure such recurrence patterns and other rules using future event tiles corresponding to home automation devices. For example, the user can use a future event tile to schedule a recurrence pattern for a tile corresponding to a car service such that the user is picked up from work every weekday at 5:30 pm. Establishing such recurrence patterns for car services may become especially useful as self-driving vehicles become more prevalent and personal car ownership decreases.

Furthermore, by using the dragging gestures described with regard to FIG. 12 to set rules and recurrence patterns, the user may coordinate actions of home automation devices and services. For example, the user may set a recurrence pattern in which the user schedules pickup by a car service for transportation home each weekday. Furthermore, in this example, the user sets a recurrence pattern to turn the front porch lights of the user's home on each weekday 15 minutes later. Thus, in this example, the front porch lights are on when the user arrives home. Hence, in this way, the user may use timeline interface 400 to coordinate the provision of real world services with actions performed by home automation devices.

Figure 14:
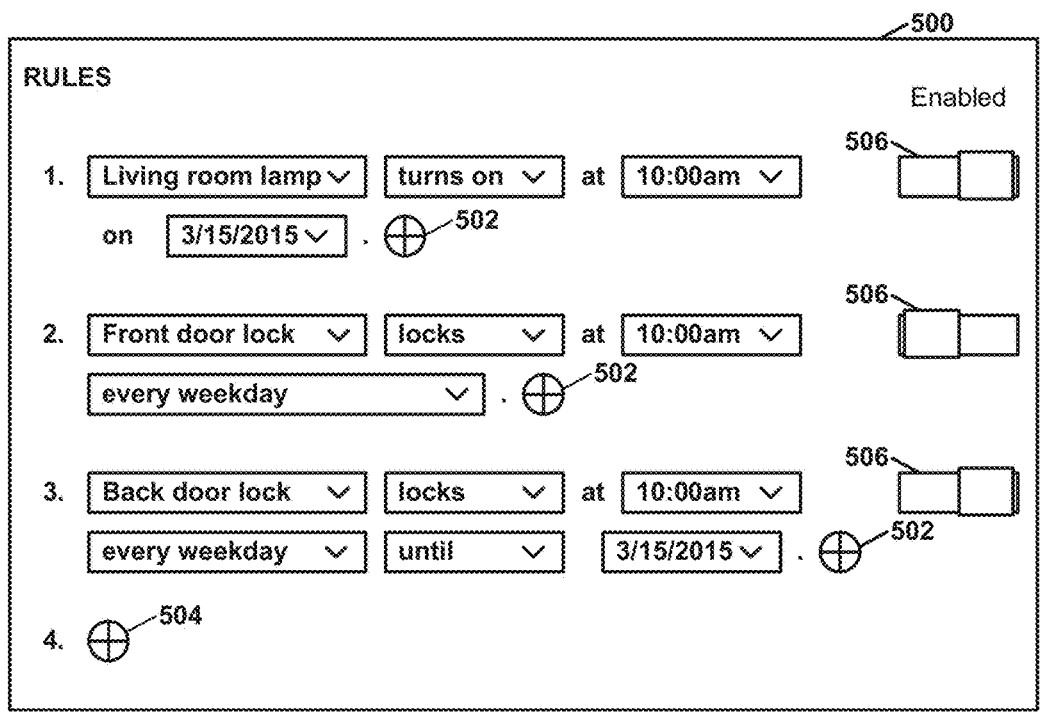
FIG. 14 is a conceptual diagram illustrating an example rules interface, in accordance with one or more techniques of this disclosure.

FIG. 14 is a conceptual diagram illustrating an example rules interface 500, in accordance with one or more techniques of this disclosure. As indicated above, server system 12 may store rule data in rule base 50. A user may use a timeline interface, or another type of interface, to create condition-action rules. Furthermore, client device 20 may output rules interface 500 for display. Rules interface 500 may display, in text form, condition-action rules for a user's home automation devices. Client device 20 may generate rules interface 500 based on data received from server system 12. Thus, condition-action rules generated using a timeline interface may be reflected in rules interface 500.

Furthermore, rules interface 500 may enable a user to create new condition-action rules and to edit existing condition-action rules. In the example of FIG. 14, each rule corresponds to a number (e.g., 1, 2, and 3). Each rule comprises a series of drop-down boxes. Each of the drop-down boxes offers the user a set of options from which to choose. Each of the options comprises one or more words or times. The user may build or edit a rule by selecting different options from the drop-down boxes. By selecting the options from the drop-down boxes, the user builds a sentence that expresses the rule. The user may add additional temporal criteria to a rule by selecting an add criteria element 502. Furthermore, a user may add a new rule by selecting an add rule element 504. Condition-action rules generated using rules interface 500 may be reflected in other interfaces, such as a timeline interface.

In the example of FIG. 14, rules interface 500 includes features 506 for enabling or disabling application of particular condition-action rules. This allows the user to create and save condition-action rules, but not have those condition-action rules be applied all of the time. For instance, in the example of FIG. 14, condition-action rules 1 and 3 are enabled, but condition-action rule 2 is disabled.

In some examples, rules interface 500 allows a user to generate arbitrary rules using conditional statements and Boolean operators (e.g., AND, OR, XOR, etc.). Additionally, although the example of FIG. 14 only shows rules that specify absolute times, rules may specify relative times (e.g., "10 minutes after").

Furthermore, in some examples, rules interface 500 allows a user to generate rules based on geographical boundaries. For example, a user may create a condition-action rule specifying that a particular target event is to occur when a device associated with the user leaves or enters a particular area. For instance, the user may create a condition-action rule specifying that a particular lamp is to turn off if the user's mobile phone leaves a particular area. In another example, the user may create a condition-action rule specifying that a garage door is to open if the user's car enters a particular area. Thus, the condition-action rules may be based on geo-fencing.

As indicated elsewhere in this disclosure, server system 12 may store metadata associated with particular home automation devices. In some examples, rules can be based on metadata associated with particular home automation devices. For instance, the metadata associated with home automation devices may include arbitrary tags. A rule may specify all home automation devices associated with a particular tag. For example, a user may attach a tag "entry lights" to a plurality of lamps. In this example, the user may create a rule indicating that all home automation devices with the tag "entry lights" are to turn on a 5:30 pm on Wednesdays.

In some examples, computer systems may analyze rules based on particular tags to suggest potential rules to users. Furthermore, in some examples, additional home automation devices needed to accomplish particular rule sets may be suggested in a user interface to a user. Additionally, in some examples, server system 12, or another device, may recommend rules or new devices based on compositions of user dashboard interfaces.

In some examples, because rules may be based on tags and not particular home automation devices, a rule created by one user may be applicable to other users. Accordingly, a user may be able to share rules developed by the user. Other users may be able to use rules developed by others without rewriting the rules. This may be especially helpful for complicated rules, such as those for holiday light displays. Hence, in some examples, client device 20 may assign a tag to rule data specifying a rule, such as a recurrent pattern. Furthermore, client device 20, server system 12, or another computing system, may search, based on tags assigned to rule data, for rule data satisfying a user-initiated query.

In some examples, a rule that specifies a target event for a first home automation device may be conditioned on the occurrence of an event of a second home automation device. For example, a user may have a network-enabled security camera and a network-enabled window alarm. In this example, a rule may specify that the network-enable security camera is to turn on when the network-enabled window alarm detects that a window was broken or opened while the network-enabled window alarm was armed.

Figure 15:
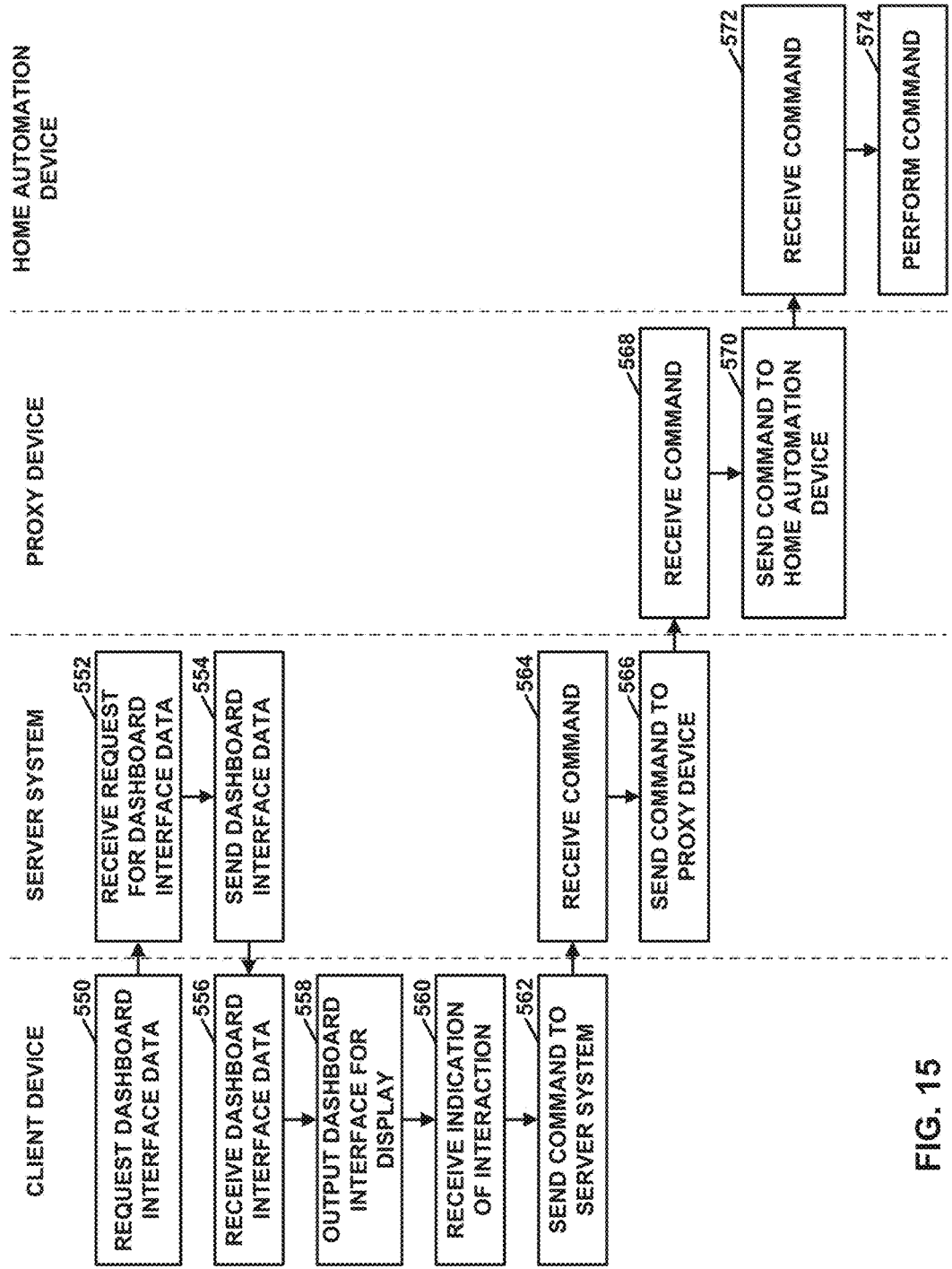
FIG. 15 is a flowchart illustrating an example operation to control a home automation device, in accordance with one or more techniques of this disclosure.

FIG. 15 is a flowchart illustrating an example operation to control a home automation device, in accordance with one or more techniques of this disclosure. FIG. 15 and the other flowcharts of this disclosure are examples. Other example operations may include more, fewer, or different actions, or include the actions in different orders.

In the example of FIG. 15, client device 20 sends, to server system 12, a request for dashboard interface data (550). Server system 12 then receives the request for the dashboard interface data (552). Responsive to the request for the dashboard interface data, server system 12 sends the dashboard interface data to client device 20 (554). Client device 20 then receives the dashboard interface data (556).

Client device 20 outputs, based on the received dashboard interface data, a dashboard interface for display (558). While the dashboard interface is displayed, client device 20 receives an indication of a user interaction with a tile of the dashboard interface (560). For example, client device 20 may receive an indication of a tapping or sliding gesture at a location within the dashboard interface corresponding to the tile. In the example of FIG. 15, the tile corresponds to a particular home automation device. In response, client device 20 sends a command to server system 12 (562).

Server system 12 then receives the command (564). Responsive to receiving the command, server system 12 sends the command to a proxy device (566). For example, server system 12 may send the command to hub device 16, access point 18, another server system, or another type of computing device. The proxy device may then receive the command (568). Responsive to receiving the command, the proxy device may send the command to the particular home automation device (570).

The particular home automation device receives the command (572). In response to receiving the command, the particular home automation device performs the command (574). For instance, the particular home automation device may perform an action to modify a parameter of the particular home automation device such that the parameter has a value specified by the command.

Figure 16:
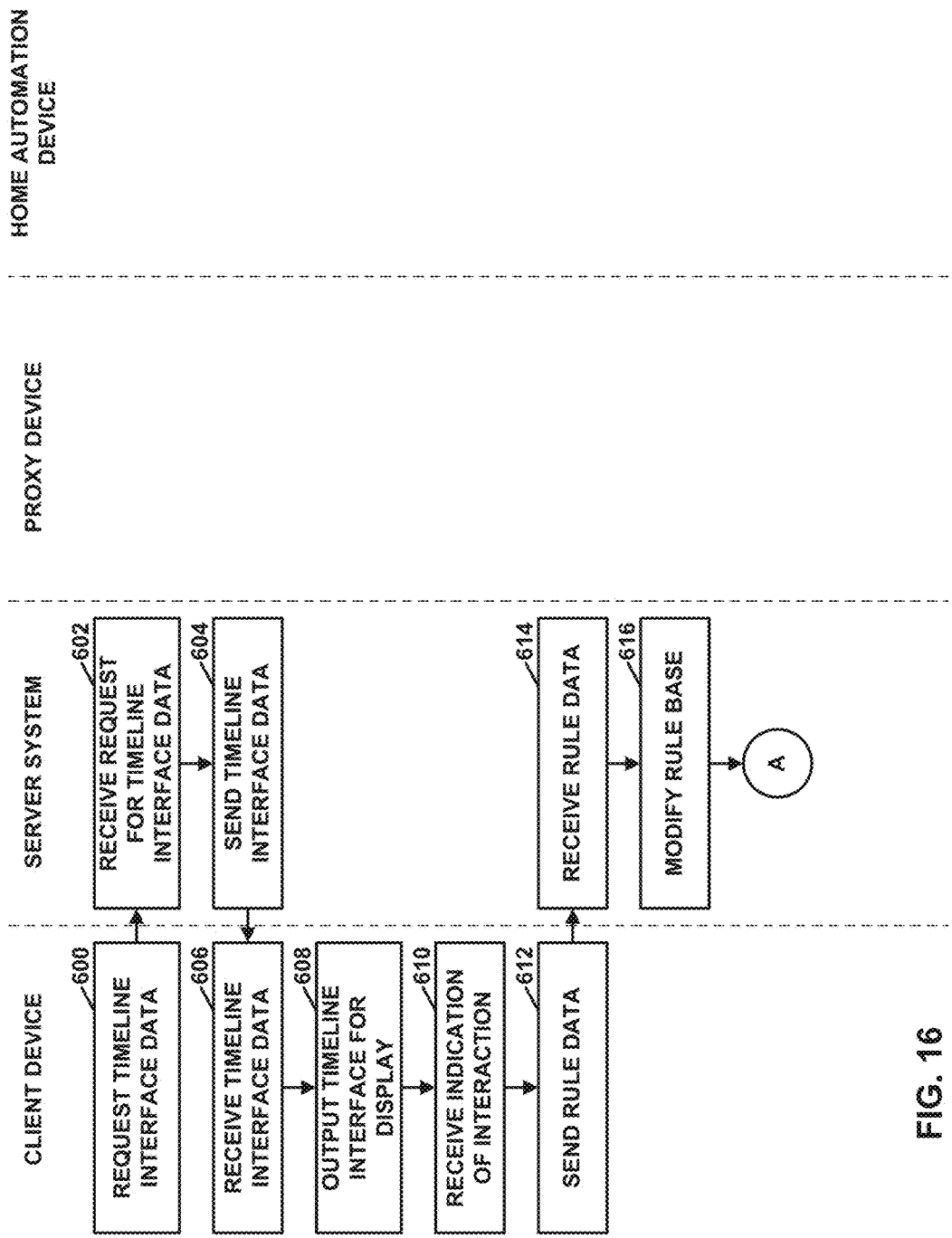
FIG. 16 is a flowchart illustrating an example operation involving a timeline interface, in accordance with one or more techniques of this disclosure.

FIG. 16 is a flowchart illustrating an example operation involving a timeline interface, in accordance with one or more techniques of this disclosure. In the example of FIG. 16, client device 20 sends, to server system 12, a request for timeline interface data (600). Server system 12 then receives the request for timeline interface data (602). Server system 12 may then send the timeline interface data to client device 20 (604). Client device 20 then receives the timeline interface data (606). The timeline interface data may include data specifying time, status, recurrence patterns and other types of information for current event tiles, future event tiles, and/or past event tiles.

Responsive to receiving the timeline interface data, client device 20 outputs, based on the timeline interface data, a timeline interface for display (608). While the timeline interface is displayed, client device 20 may receive an indication of user interaction with a future event tile or a past event tile in the timeline interface (610).

Responsive to receiving the indication of user interaction, client device 20 may send rule data to server system 12 (612). Server system 12 may then receive the rule data (614). Server system 12 may then modify rule base 50 based on the rule data (616). For example, server system 12 may add or change a condition-action rule in rule base 50. The example operation of FIG. 16 continues in FIG. 17.

Figure 17:
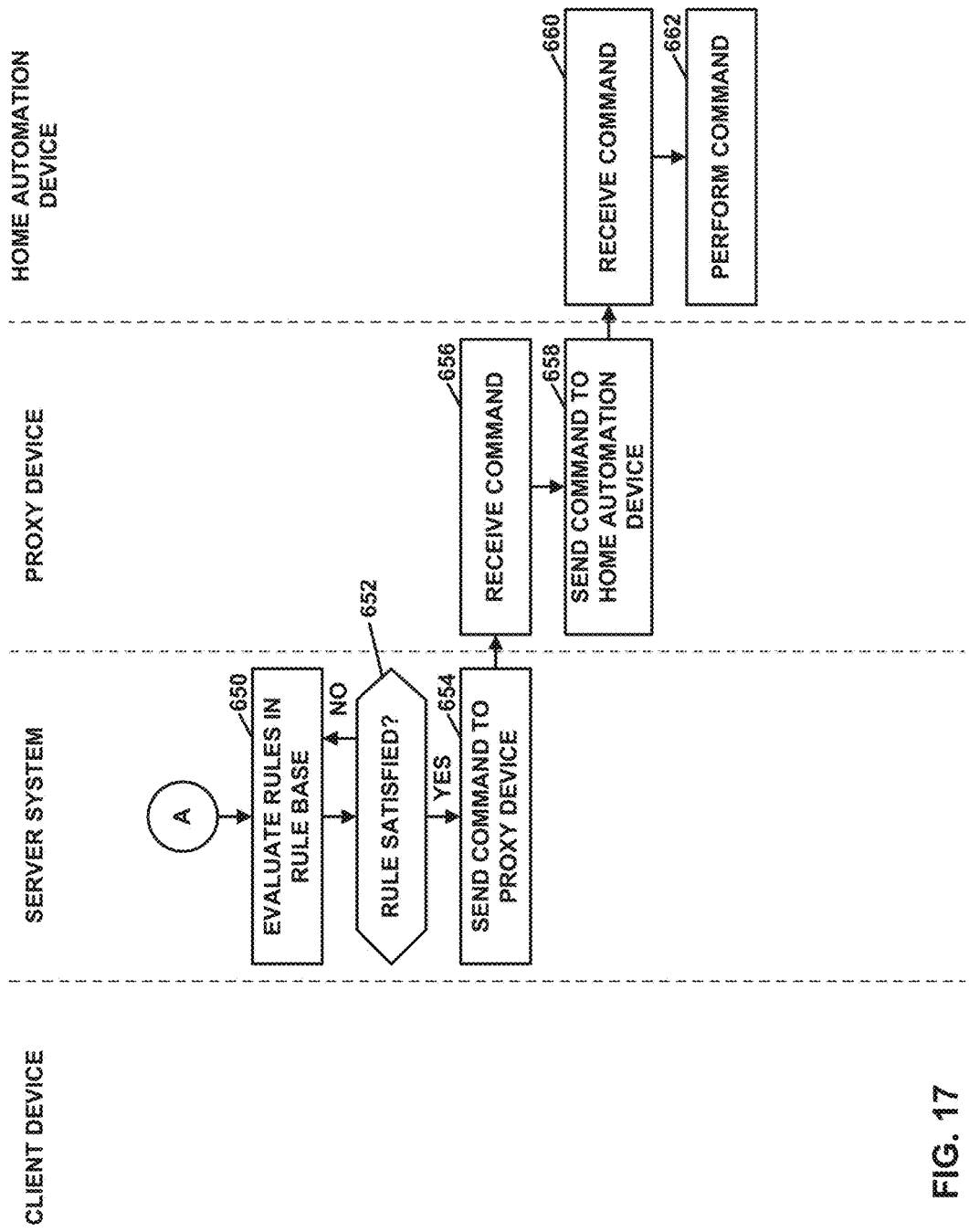
FIG. 17 is a continuation of the example operation of FIG. 16.

FIG. 17 is a continuation of the example operation of FIG. 16. In the example of FIG. 17, server system 12 evaluates rules in rule base 50 to determine whether conditions of a rule in rule base 50 have been satisfied (650). For example, a rule may specify that a particular home automation device is to perform a particular action when a current time is 3:00 pm on Mar. 15, 2015. In this example, if the current time is 3:00 pm on Mar. 15, 2015, server system 12 determines that the conditions of the rule have been satisfied. If the conditions of a rule have not been satisfied ("NO" of 652), server system 12 may continue to evaluates rules in rule base 50 (650). On the other hand, in response to determining that the conditions of a rule have been satisfied ("YES" of 652), server system 12 may send a command to a proxy device (654). The proxy device may be hub device 16, access point 18, another server system, and another type of device. The command may instruct a particular home automation device to perform an action specified by the rule.

The proxy device may then receive the command (656). In response, the proxy device may send a command to the particular home automation device (658). The particular home automation device may then receive the command (660). In response to receiving the command, the particular home automation device may perform the action indicated by the command (662).

Figure 18:
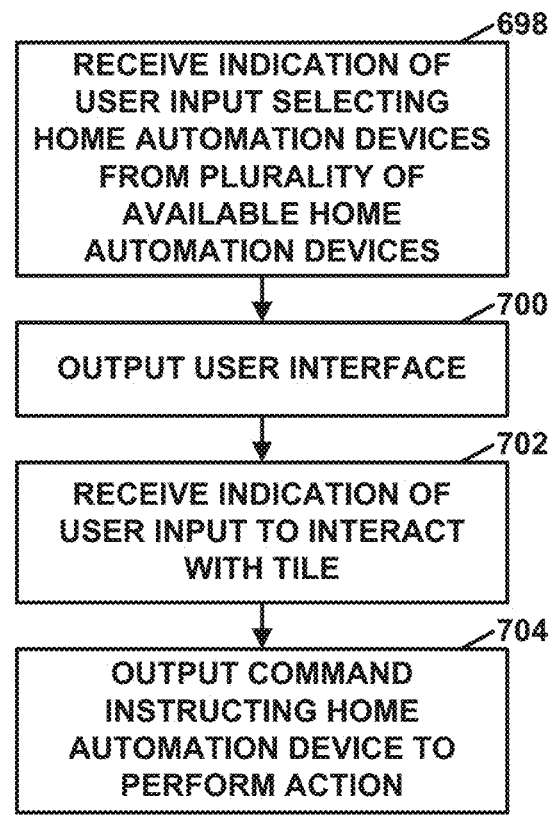
FIG. 18 is a flowchart illustrating an example operation of a client device, in accordance with one or more techniques of this disclosure.

FIG. 18 is a flowchart illustrating an example operation of a client device, in accordance with one or more techniques of this disclosure. The operation of FIG. 18 may comprise a method for monitoring and controlling home automation devices. In the example of FIG. 18, a computing device, such as client device 20, may receive indications of user input selecting, from a plurality of available home automation devices, home automation devices to control via a dashboard interface (698). For example, a user may have configured server system 12 to interact with ten home automation devices at the user's home. In this example, the home automation devices configured to interact with server system 12 are the available home automation devices. In this example, the client device may receive indications of user input to select five of the available home automation devices to control via the dashboard interface. Thus, the fact that a home automation device is available to be controlled from the client device does not mean that a tile corresponding to the home automation device is present in the dashboard interface.

In the example of FIG. 18, the client device outputs, for display by a display device, a user interface for monitoring and controlling a plurality of home automation devices (700). The user interface comprises a plurality of tiles. The plurality of tiles may include one or more user-selected tiles included in the user interface as a result of user input to include the one or more user-selected tiles in the user interface, such as tile corresponding to the selected home automation devices. For each respective tile of the plurality of tiles, the respective tile corresponds to a respective home automation device in the plurality of home automation devices. The respective tile may indicate a current status of a parameter of the respective home automation device. Furthermore, the respective tile may be associated with a respective command invoked in response to user interaction with the respective tile. The respective command may instruct the respective home automation device to perform an action that modifies the parameter of the respective home automation device.

Furthermore, in the example of FIG. 18, the computing device may receive an indication of user input to interact with a particular tile from the plurality of tiles (702). In some examples, the indication of user input to interact with the particular tile comprises receiving, by the computing device, an indication of a dragging gesture that corresponds, at least in part, to a location within the user interface of the particular tile. Responsive to the indication of user input to interact with the particular tile, the computing device may output a command instructing a particular home automation device corresponding to the particular tile to perform an action that modifies a parameter of the particular home automation device (704). In some examples, sending the command comprises sending, by the computing device, the command to a server system that relays the command directly or indirectly to the particular home automation device.

In one example, the computing device receives an indication of a second user input. In this example, the second user input is provided by a first user. Responsive to the indication of the second user input, the computing device may send data indicating that a second, different user is allowed to use the user interface to monitor and control home automation devices corresponding to the plurality of tiles of the user interface. In this way, the first user may share a dashboard interface with a second user. Furthermore, in some examples, the computing device receives one or more indications of additional user input. The additional user input may specify a time interval during which the second user is allowed to use the user interface to monitor and control the plurality of home automation devices. Responsive to the indication of the user input, the computing device may send, to the server system, data indicating the time interval.

Furthermore, in some examples, the user interface is a first user interface, the user input is a first user input, and the plurality of tiles is a first plurality of tiles. In some such examples, the computing device receives an indication of a second user input. The second user input is to create a second user interface. Furthermore, the computing device may receive indications of additional user input to include a second plurality of tiles in the second user interface. The second plurality of tiles may include at least one tile that corresponds to a same home automation device as a tile in the first plurality of tiles. The computing device may output the second user interface for display by the display device. In some examples, wherein the second user interface includes at least one tile that corresponds to a home automation device that is not in the first plurality of home automation devices.

Figure 19:
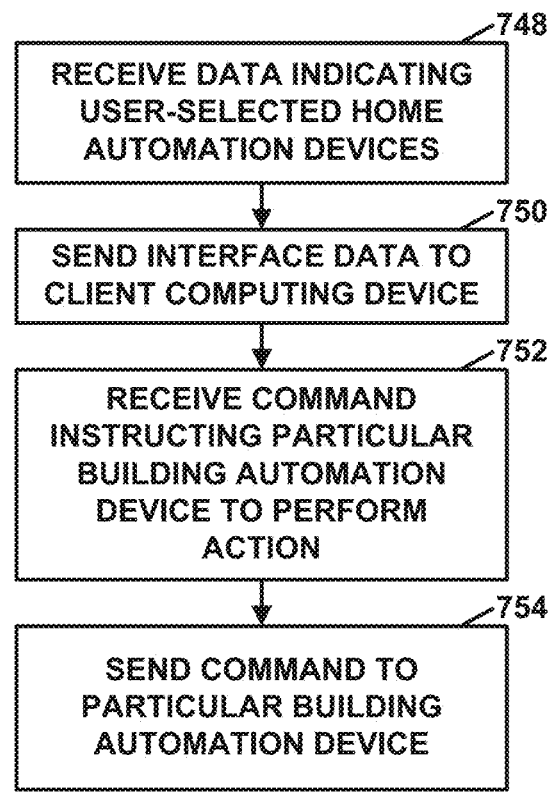
FIG. 19 is a flowchart illustrating an example operation of a server system, in accordance with one or more techniques of this disclosure.

FIG. 19 is a flowchart illustrating an example operation of server system 12, in accordance with one or more techniques of this disclosure. The operation of FIG. 19 may comprise a method for monitoring and controlling home automation devices.

In the example of FIG. 19, server system 12 may receive data indicating one or more user-selected home automation devices from a plurality of available home automation devices (748). Furthermore, server system 12 may send interface data to a client computing device (e.g., client device 20) (750). The interface data may enable the client computing device to output a user interface for display. The user interface comprises a plurality of tiles. The plurality of tiles includes one or more user-selected tiles included in the user interface as a result of user input to include the one or more user-selected tiles in the user interface. That is, the plurality of tiles may include a respective tile corresponding to each respective home automation device of the one or more user-selected home automation devices. For each respective tile of the plurality of tiles, the respective tile corresponds to a respective home automation device in a plurality of home automation devices. The respective tile may indicate a current status of a parameter of the respective home automation device. The respective tile may be associated with a respective command invoked in response to user interaction with the respective tile, the respective command instructing the respective home automation device to perform an action that modifies a parameter of the respective home automation device.

Furthermore, server system 12 may receive, from the client computing device, a command instructing a particular home automation device to perform a command associated with a tile corresponding to the particular home automation device (752). Responsive to receiving the command, server system 12 may send the command to the particular home automation device (754).

In some examples, server system 12 transforms the command received from the client computing device to a format understood by the particular home automation device. In such examples, server system 12 may send the transformed command to the particular home automation device.

Furthermore, in some examples, server system 12 receives a set of event data indicating the occurrence of an event at the particular home automation device. In such examples, server system 12 may send data enabling the client computing device to update, based on the occurrence of the event, a status of the tile corresponding to the particular home automation device. In some examples, server system 12 receives a set of event data indicating the occurrence of an event at the particular home automation device and posts data indicating the occurrence of the event to a social media system.

Additionally, in some examples, the command is a first command and the server system receives a text message specifying a second command. The second command instructs the particular home automation device to perform a particular action to modify a parameter of the particular home automation device. Responsive to receiving the text message, server system 12 may send the second command to the particular home automation device. In this example, the server system may receive the text message from a virtual personal assistant system.

Figure 20:
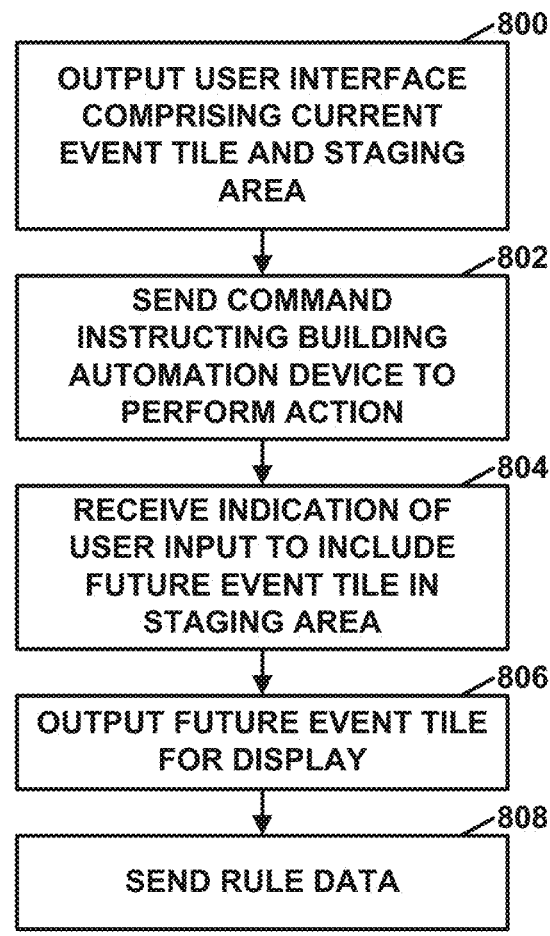
FIG. 20 is a flowchart illustrating an example operation of a client device, in accordance with one or more techniques of this disclosure.

FIG. 20 is a flowchart illustrating an example operation of client device 20, in accordance with one or more techniques of this disclosure. The example operation of FIG. 20 may comprise a method for controlling home automation devices.

In the example of FIG. 20, client device 20 outputs a user interface (e.g., a timeline interface) for display (800). The user interface comprises a current event tile and a staging area. Different positions in the staging area along an axis correspond to different times in the future. The current event tile corresponds to a home automation device. The current event tile may indicate a current status of a parameter of the home automation device.

Responsive to an indication of a user interaction with the current event tile, client device 20 may send a command instructing the home automation device to perform an action that modifies the parameter of the respective home automation device (802).

Furthermore, client device 20 may receive an indication of a user input to include a future event tile in the staging area at a position corresponding to a particular time that is in the future (804). The future event tile may indicate a target status of the parameter of the home automation device. Responsive to the indication of the user input, client device 20 may output, for display, the future event tile in the staging area at the position corresponding to the particular time (806). In addition, client device 20 may send, to a server system (e.g., server system 12), rule data specifying that the home automation device is to perform an action to attain the target status of the parameter of the home automation device at the particular time (808).

In some examples, the user input is a first user input and the rule data is first rule data. In some such examples, client device 20 may receive indications of one or more additional user inputs. Responsive to the indications of the one or more additional user inputs, client device 20 may send second rule data to the server system. The second rule data may specify a recurrence pattern for the future event tile. The recurrence pattern for the future event tile may comprise a recurrence of the home automation device performing the action to attain the target status of the parameter of the home automation device. Furthermore, in some examples, the future event tile is a first future event tile, the staging area includes a second future event tile, and client device 20 receives an indication of a second user input. The second user input comprises a dragging gesture originating at a position in the user interface corresponding to a second future event tile and terminating at a location in the user interface corresponding to the first future event tile. Responsive to the indication of the second user input, client device 20 may send third rule data to the server system. The third rule data may specify a recurrence pattern for the second future event tile. The recurrence pattern for the second future event tile may be the same as the recurrence pattern for the first future event tile. In this example, the second future event tile did not have a recurrence pattern or had a different recurrence pattern prior to the client computing device receiving the indication of the second user input. In some such examples, the home automation device is a first home automation device and the second future event tile corresponds to a second home automation device different from the first home automation device. Furthermore, in some such examples, the particular time is a first time, and before and after the client computing device receives the indication of the second user input, the second future event tile corresponds to a second time that is in the future, the second time being different than the first time.

Figure 21:
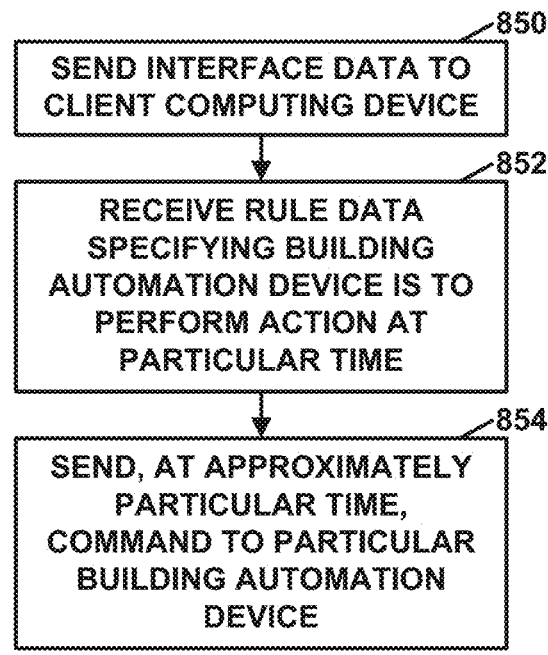
FIG. 21 is a flowchart illustrating an example operation of a server system, in accordance with one or more techniques of this disclosure.

FIG. 21 is a flowchart illustrating an example operation of server system 12, in accordance with one or more techniques of this disclosure. The example operation of FIG. 21 may comprise a method for controlling home automation devices.

In the example of FIG. 21, server system 12 sends interface data to a client computing device (e.g., client device 20). The interface data enables the client computing device to output a user interface for display. The user interface may comprise a current event tile and a staging area. Different positions in the staging area along an axis correspond to different times in the future. The current event tile corresponds to a home automation device. The current event tile indicates a current status of a parameter of the home automation device. The current event tile is associated with a respective command invoked in response to user interaction with the respective tile, the respective command instructing the respective home automation device to perform an action that modifies a parameter of the respective home automation device. Furthermore, the user interface may enable a user to position a future event tile at a position within the staging area corresponding to a particular time that is in the future. In the example of FIG. 21, the future event tile indicates a target status of the parameter of the home automation device.

Furthermore, in the example of FIG. 21, server system 12 receives, from the client computing device, rule data specifying that the home automation device is to perform an action to attain the target status of the parameter of the home automation device at the particular time (852). In addition, server system 12 sends, at approximately the particular time, a command instructing the home automation device to perform the action to attain the target status of the parameter of the home automation device (854). For instance, server system 12 may send the command a sufficient time before the particular time to enable the home automation device to perform the action at the particular time.

The following paragraphs list examples in accordance with the techniques of this disclosure. However, the techniques of this disclosure are not limited to the examples provided in the following paragraphs.

Example 1A

A method for monitoring and controlling home automation devices, the method comprising: outputting, by a computing device, for display by a display device, a user interface for monitoring and controlling a plurality of home automation devices, wherein: the user interface comprises a plurality of tiles, the plurality of tiles includes one or more user-selected tiles included in the user interface as a result of user input to include the one or more user-selected tiles in the user interface, for each respective tile of the plurality of tiles: the respective tile corresponds to a respective home automation device in the plurality of home automation devices, the respective tile indicates a current status of a parameter of the respective home automation device, the respective tile is associated with a respective command invoked in response to user interaction with the respective tile, the respective command instructing the respective home automation device to perform an action that modifies the parameter of the respective home automation device; receiving, by the computing device, an indication of user input to interact with a particular tile from the plurality of tiles; and responsive to the indication of user input to interact with the particular tile, outputting, by the computing device, a command instructing a particular home automation device corresponding to the particular tile to perform an action that modifies a parameter of the particular home automation device.

Example 2A

The method of example 1A, wherein the indication of user input is an indication of a first user input, the method further comprising: receiving, by the computing device, an indication of a second user input, the second user input being provided by a first user; and responsive to the indication of the second user input, sending, by the computing device, data indicating that a second, different user is allowed to use the user interface to monitor and control home automation devices corresponding to the plurality of tiles of the user interface.

Example 3A

The method of example 2A, further comprising: receiving, by the computing device, one or more indications of additional user input, the additional user input specifying a time interval during which the second user is allowed to use the user interface to monitor and control the plurality of home automation devices; and responsive to the indication of the third user input, sending, by the computing device, to a server system, data indicating the time interval.

Example 4A

The method of example 1A, wherein the user interface is a first user interface, the user input is a first user input, the plurality of tiles is a first plurality of tiles, and the method further comprises: receiving, by the computing device, an indication of a second user input, the second user input being to create a second user interface; receiving, by the computing device, indications of additional user input to include a second plurality of tiles in the second user interface, the second plurality of tiles including at least one tile that corresponds to a same home automation device as a tile in the first plurality of tiles; and outputting, by the computing device, the second user interface for display by the display device.

Example 5A

The method of example 4A, wherein the second user interface includes at least one tile that corresponds to a home automation device that is not in the first plurality of home automation devices.

Example 6A

The method of example 1A, wherein receiving the indication of user input to interact with the particular tile comprises receiving, by the computing device, an indication of a dragging gesture that corresponds, at least in part, to a location within the user interface of the particular tile.

Example 7A

The method of example 1A, wherein the indication of user input is an indication of a first user input, the tile is a first tile, the method further comprising: responsive to receiving an indication of a second user input, generating, by the computing device, a second tile, the second tile corresponding to multiple home automation devices of the plurality of home automation devices; and responsive to an indication of user input to interact with the tile corresponding to the multiple home automation devices, outputting, by the computing device, one or more commands instructing the home automation devices corresponding to the second tile to perform actions that modify parameters of the home automation devices corresponding to the second tile.

Example 8A

The method of example 7A, wherein the home automation devices corresponding to the second tile include a first home automation device and a second home automation device, the user interface comprises a first tile corresponding to the first home automation device and a second tile corresponding to the second home automation device; and the method further comprises: receiving, by the computing device, the indication of the second user input, the second user input comprising a gesture dragging the first tile to the second tile.

Example 1B

A method for monitoring and controlling home automation devices, the method comprising: receiving, by a server system, data indicating a plurality of user-selected home automation devices from a plurality of available home automation devices; sending, by a server system, interface data to a client computing device, the interface data enabling the client computing device to output a user interface for display, wherein: the user interface comprises a plurality of tiles, the plurality of tiles includes a respective tile corresponding to each respective home automation device of the one or more user-selected home automation devices, for each respective tile of the plurality of tiles: the respective tile corresponds to a respective home automation device in a plurality of home automation devices, the respective tile indicates a current status of a parameter of the respective home automation device, and the respective tile is associated with a respective command invoked in response to user interaction with the respective tile, the respective command instructing the respective home automation device to perform an action that modifies the parameter of the respective home automation device; receiving, by the server system, from the client computing device, a command instructing a particular home automation device to perform a command associated with a tile corresponding to the particular home automation device; and responsive to receiving the command, sending, by the server system, the command to the particular home automation device.

Example 2B

The method of example 1B, wherein the command is a first command, the method further comprising: receiving, by the server system, from a social media system, a message specifying a second command, the second command instructing the particular home automation device to perform a particular action to modify a parameter of the particular home automation device; and responsive to receiving the message, sending, by the server system, the second command to the particular home automation device.

Example 3B

The method of example 1B, wherein the command is a first command, the method further comprising: receiving, by the server system, a text message specifying a second command, the second command instructing the particular home automation device to perform a particular action to modify a parameter of the particular home automation device; and responsive to receiving the text message, sending, by the server system, the second command to the particular home automation device.

Example 4B

The method of example 3B, wherein the text message is an SMS message or an instant message.

Example 5B

The method of example 3B, wherein receiving the text message comprises receiving, by the server system, the text message from a virtual personal assistant system.

Example 6B

The method of example 1B, further comprising: generating, by the server system, a text question based at least in part on event data from the particular home automation device, the text question inquiring whether a user wants to modify a parameter of the particular home automation device; and sending, by the server system, the text question to a client device.

Example 7B

The method of example 1B, further comprising: generating, by the server system, a text question based at least in part on event data from the particular home automation device, the text question inquiring whether a user wants to modify a parameter of the particular home automation device; and sending, by the server system, the text question to a virtual personal assistant system configured to convert the text question to speech.

Example 1C

A method for controlling home automation devices, the method comprising: outputting, by a client computing device, a user interface for display, the user interface comprising a current event tile and a staging area, wherein: different positions in the staging area along an axis correspond to different times in the future; the current event tile corresponds to a home automation device, the current event tile indicates a current status of a parameter of the home automation device, and responsive to an indication of a user interaction with the current event tile, sending, by the client computing device, a command instructing the home automation device to perform an action that modifies the parameter of the respective home automation device; receiving, by the client computing device, an indication of a user input to include a future event tile in the staging area at a position corresponding to a particular time that is in the future, the future event tile indicating a target status of the parameter of the home automation device; and responsive to the indication of the user input: outputting, by the client computing device, for display, the future event tile in the staging area at the position corresponding to the particular time; and sending, by the client computing device, to a server system, rule data specifying that the home automation device is to perform an action to attain the target status of the parameter of the home automation device at the particular time.

Example 2C

The method of example 1C, wherein receiving the indication of the user input comprises receiving, by the client computing device, an indication of a dragging gesture originating at a location within the user interface corresponding to the current event tile and terminating at a location within the staging area of the user interface corresponding to the particular time.

Example 3C

The method of example 1C, wherein receiving the indication of the user input comprises receiving, by the client computing device, an indication of a tapping gesture at a location within the staging area of the user interface that is horizontally or vertically aligned with the current event tile and that corresponds to the particular time.

Example 4C

The method of example 1C, wherein the user input is a first user input, the method further comprising: receiving, by the client computing device, an indication of a second user input, the second user input being targeted at the future event tile; and responsive to receiving the indication of the second user input, updating, by the client computing device, the target status of the parameter of the home automation device.

Example 5C

The method of example 1C, wherein the user input is a first user input, the rule data is first rule data, and the method further comprises: receiving, by the client computing device, indications of one or more additional user inputs; and responsive to the indications of the one or more additional user inputs, sending, by the client computing device, second rule data to the server system, the second rule data specifying a recurrence pattern for the future event tile, the recurrence pattern for the future event tile being a recurrence of the home automation device performing the action to attain the target status of the parameter of the home automation device.

Example 6C

The method of example 5C, further comprising: assigning, by the client computing device, a tag to the second rule data; and searching, by the client computing device, based on tags assigned to rule data, for rule data satisfying a user-initiated query.

Example 7C

The method of example 5C, wherein the future event tile is a first future event tile, the staging area includes a second future event tile, the method further comprising: receiving, by the client computing device, an indication of a second user input, wherein the second user input comprises a dragging gesture originating at a position in the user interface corresponding to a second future event tile and terminating at a location in the user interface corresponding to the first future event tile; and responsive to the indication of the second user input, sending, by the client computing device, third rule data to the server system, the third rule data specifying a recurrence pattern for the second future event tile, the recurrence pattern for the second future event tile being the same as the recurrence pattern for the first future event tile, wherein the second future event tile did not have a recurrence pattern or had a different recurrence pattern prior to the client computing device receiving the indication of the second user input.

Example 8C

The method of example 7C, wherein the home automation device is a first home automation device and the second future event tile corresponds to a second home automation device different from the first home automation device.

Example 9C

The method of example 7C, wherein the particular time is a first time, and before and after the client computing device receives the indication of the second user input, the second future event tile corresponds to a second time that is in the future, the second time being different than the first time.

Example 10C

The method of example 1C, wherein the user input is a first user input and the method further comprises: receiving, by the client computing device, from the server system, data indicating an occurrence of an event at the home automation device; and outputting, by the client computing device, for display, a past event tile at a location within the user interface corresponding to a time at which the event occurred, the past event tile indicating the occurrence of the event at the home automation device, wherein the past event tile is aligned with the current event tile corresponding to the home automation device.

Example 1D

A method for controlling home automation devices, the method comprising: sending, by a server system, interface data to a client computing device, the interface data enabling the client computing device to output a user interface for display, wherein: the user interface comprises a current event tile and a staging area, wherein: different positions in the staging area along an axis correspond to different times in the future, the current event tile corresponds to a home automation device, the current event tile indicates a current status of a parameter of the home automation device, the current event tile is associated with a respective command invoked in response to user interaction with the respective tile, the respective command instructing the respective home automation device to perform an action that modifies the parameter of the respective home automation device, and the user interface enables a user to position a future event tile at a position within the staging area corresponding to a particular time that is in the future, the future event tile indicating a target status of the parameter of the home automation device; receiving, by the server system, from the client computing device, rule data specifying that the home automation device is to perform an action to attain the target status of the parameter of the home automation device at the particular time; and sending, by the server system, at approximately the particular time, a command instructing the home automation device to perform the action to attain the target status of the parameter of the home automation device.

Example 2D

The method of example 1D, further comprising: receiving, by the server system, from the client computing device, rule data specifying a recurrence pattern for the home automation device performing the action to attain the target status of the parameter of the home automation device; and sending, by the server system, based on the recurrence pattern, commands instructing the home automation device to perform the action to attain the target status of the parameter of the home automation device.

Example 3D

The method of example 1D, further comprising: receiving, by the server system, a set of event data indicating an occurrence of an event at the home automation device; and sending, by the server system, to the client computing device, data enabling the client computing device to output a past event tile at a location within the user interface corresponding to a time at which the event occurred, the past event tile indicating the occurrence of the event at the home automation device.

Example 1E

A method for security monitoring, the method comprising: receiving, by a server system, event data from one or more home automation devices; sending, by the server system, interface data to a client computing device, the interface data enabling the client computing device to output a user interface for display, wherein: the user interface comprises data indicating current statuses of the one or more home automation devices, the data indicating current statuses of the one or more home automation devices is based on the event data received from the one or more home automation devices; receiving, by the server system, an indication of user input to start using a security monitoring service that monitors a premises for emergencies; and responsive to the indication of the user input to activate the security monitoring services, sending, by the server system, security-related data to the security monitoring service, wherein the security-related data is based on the event data.

Example 2E

The method of example 1E, further comprising: receiving, by the server system, a command from the security monitoring service, the command instructing a particular home automation device of the one or more home automation devices to perform an action; and responsive to receiving the command, sending, by the server system, the command to the particular home automation device.

Example 3E

The method of example 1E, further comprising: receiving, by the server system, a voice data from the security monitoring service; and responsive to receiving the voice data, sending, by the server system, the voice data to the particular home automation device.

Example 4E

The method of example 1E, wherein the one or more home automation devices include at least one of: a security camera, a window or door alarm, a window or door lock, and a hazardous gas alarm.

Example 1F

A computing device configured to perform any combination of the methods in examples 1A through 8A, 1B through 7B, 1C through 10C, 1D through 3D, and/or 1E through 4D.

Example 1G

A non-transitory computer readable data storage medium comprising instructions that, when executed, configure a computing device to perform any combination of the methods in examples 1A through 8A, 1B through 7B, 1C through 10C, 1D through 3D and/or 1E through 4D.

It is to be recognized that depending on the embodiment, certain acts or events of any of the methods described herein may be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other embodiments are within the scope of the following claims.

The invention claimed is:

1. A method for controlling home automation devices or services, the method comprising:
outputting, by a client computing device, a user interface for display, the user interface comprising a staging area, wherein different positions in the staging area along an axis correspond to different times in the future;
receiving, by the client computing device, an indication of a first user input to include a first future event tile in the staging area at a position corresponding to a first time that is in the future, the first future event tile indicating a target status of a parameter of a first home automation device or service; and
responsive to the indication of the first user input outputting, by the client computing device, for display, the first future event tile in the staging area at the position corresponding to the first time;
sending, by the client computing device, to a server system, first rule data specifying a recurrence pattern for the first future event tile, the first rule data configuring the server system to send, based on the recurrence pattern for the first future event tile, commands instructing the first home automation device or service to perform an action to attain the target status of the parameter of the first home automation device or service;
receiving, by the client computing device, an indication of a second user input to include a second, different future event tile in the staging area at a position corresponding to a second time that is in the future, the second future event tile indicating a target status of a parameter of a second home automation device or service;
responsive to the indication of the second user input, outputting, by the client computing device, for display, the second future event tile in the staging area at the position corresponding to the second time;
receiving, by the client computing device, an indication of a third user input, wherein the third user input comprises a dragging gesture originating at a position in the staging area corresponding to the second future event tile and terminating at a location in the staging area corresponding to the first future event tile; and
responsive to the indication of the third user input, sending, by the client computing device, second rule data to the server system, the second rule data specifying a recurrence pattern for the second future event tile, the recurrence pattern for the second future event tile being the same as the recurrence pattern for the first future event tile, wherein the second future event tile did not have a recurrence pattern or had a different recurrence pattern prior to the client computing device receiving the indication of the third user input.

2. The method of claim 1, wherein the dragging gesture is a second dragging gesture and receiving the indication of the first user input comprises receiving, by the client computing device, an indication of a first dragging gesture originating at a location within the user interface corresponding to a current event tile and terminating at a location within the staging area of the user interface corresponding to the first time, the current event tile indicating a current status of the parameter of the first home automation device or service.

3. The method of claim 1, wherein receiving the indication of the first user input comprises receiving, by the client computing device, an indication of a tapping gesture at a location within the staging area of the user interface that is horizontally or vertically aligned with a current event tile and that corresponds to the first time, the current event tile indicating a current status of the parameter of the first home automation device or service.

4. The method of claim 1, further comprising:
receiving, by the client computing device, an indication of a fourth user input, the fourth user input being targeted at the first future event tile; and
responsive to receiving the indication of the fourth user input, updating, by the client computing device, the target status of the parameter of the first home automation device or service.

5. The method of claim 1, wherein the recurrence pattern for the first future event tile comprises one or more recurrences of the first home automation device or service performing the action to attain the target status of the parameter of the first home automation device or service.

6. The method of claim 1, further comprising:
assigning, by the client computing device, a tag to the second rule data; and
searching, by the client computing device, based on tags assigned to rule data, for rule data satisfying a user-initiated query.

7. The method of claim 1, wherein the second home automation device or service is different from the first home automation device or service.

8. The method of claim 1, wherein the the second time is different than the first time.

9. The method of claim 1, further comprising:
receiving, by the client computing device, from the server system, data indicating an occurrence of an event at the first home automation device or service; and
outputting, by the client computing device, for display, a past event tile at a location within the user interface corresponding to a time at which the event occurred, the past event tile indicating the occurrence of the event at the first home automation device or service, wherein the past event tile is aligned with a current event tile corresponding to the first home automation device or service, the current event tile indicating a current status of the parameter of the first home automation device or service.

10. A method for controlling home automation devices or services, the method comprising:
sending, by a server system, interface data to a client computing device, the interface data enabling the client computing device to output a user interface for display, wherein:
the user interface comprises a staging area, wherein:
different positions in the staging area along an axis correspond to different times in the future, and
the user interface enables a user to position a first future event tile at a position within the staging area corresponding to a first time that is in the future, the first future event tile indicating a target status of a parameter of a first home automation device or service, and
the user interface enables the user to position a second, different future event tile in the staging area at a position corresponding to a second time that is in the future, the second future event tile indicating a target status of a parameter of a second home automation device or service;
receiving, by the server system, from the client computing device, first rule data specifying a recurrence pattern for the first future event tile;
sending, by the server system, based on the recurrence pattern for the first future event tile, commands instructing the first home automation device or service to perform an action to attain the target status of the parameter of the first home automation device or service;
receiving, by the server system, second rule data from the client computing device in response to the client computing system receiving a dragging gesture originating at a position in the staging area corresponding to the second future event tile and terminating at a location in the staging area corresponding to the first future event tile, the second rule data specifying a recurrence pattern for the second future event tile, the recurrence pattern for the second future event tile being the same as the recurrence pattern for the first future event tile, wherein the second future event tile did not have a recurrence pattern or had a different recurrence pattern prior to the client computing device receiving the dragging gesture; and
sending, by the server system, based on the recurrence pattern for the second future event tile, commands instructing the second home automation device or service to perform an action to attain the target status of the parameter of the second home automation device or service.

11. The method of claim 10, further comprising:
receiving, by the server system, a set of event data indicating an occurrence of an event at the first home automation device or service; and
sending, by the server system, to the client computing device, data enabling the client computing device to output a past event tile at a location within the user interface corresponding to a time at which the event occurred, the past event tile indicating the occurrence of the event at the first home automation device or service.

12. A non-transitory computer readable data storage medium comprising instructions that, when executed, configure a computing device to:
output a user interface for display, the user interface comprising a staging area, wherein different positions in the staging area along an axis correspond to different times in the future;
receive an indication of a first user input to include a first future event tile in the staging area at a position corresponding to a first time that is in the future, the first future event tile indicating a target status of a parameter of a first home automation device or service;
responsive to the indication of the first user input output, for display, the first future event tile in the staging area at the position corresponding to the first time;
send, to a server system, first rule data specifying a recurrence pattern for the first future event tile, the first rule data configuring the server system to send, based on the recurrence pattern for the first future event tile, commands instructing the first home automation device or service is to perform an action to attain the target status of the parameter of the first home automation device or service;
receive an indication of a second user input to include a second, different future event tile in the staging area at a position corresponding to a second time that is in the future, the second future event tile indicating a target status of a parameter of a second home automation device or service;
responsive to the indication of the second user input, output, for display, the second future event tile in the staging area at the position corresponding to the second time;
receive an indication of a third user input, wherein the third user input comprises a dragging gesture originating at a position in the staging area corresponding to the second future event tile and terminating at a location in the staging area corresponding to the first future event tile; and
responsive to the indication of the third user input, send second rule data to the server system, the second rule data specifying a recurrence pattern for the second future event tile, the recurrence pattern for the second future event tile being the same as the recurrence pattern for the first future event tile, wherein the second future event tile did not have a recurrence pattern or had a different recurrence pattern prior to the client computing device receiving the indication of the third user input.

13. The non-transitory computer readable storage medium of claim 12, wherein the dragging gesture is a second dragging gesture, and the instructions that configure the computing device to receive the indication of the first user input comprise instructions that, when executed, configure the computing device to receive an indication of a first dragging gesture originating at a location within the user interface corresponding to a current event tile and terminating at a location within the staging area of the user interface corresponding to the first time, the current event tile indicating a current status of the parameter of the first home automation device or service.

14. The non-transitory computer readable storage medium of claim 12, wherein the instructions, when executed, further configure the computing device to:
   receive an indication of a fourth user input, the fourth user input being targeted at the first future event tile; and
   responsive to receiving the indication of the fourth user input, update the target status of the parameter of the first home automation device or service.

15. The non-transitory computer readable storage medium of claim 12, wherein the recurrence pattern for the first future event tile comprises one or more recurrences of the first home automation device or service performing the action to attain the target status of the parameter of the first home automation device.

16. The non-transitory computer readable storage medium of claim 12, wherein the second home automation device or service is different from the first home automation device or service.

17. The non-transitory computer readable storage medium of claim 12, wherein the instructions when executed further configure the computing device to:
   receive, from the server system, data indicating an occurrence of an event at the first home automation device or service; and
   output, for display, a past event tile at a location within the user interface corresponding to a time at which the event occurred, the past event tile indicating the occurrence of the event at the first home automation device or service, wherein the past event tile is aligned with a current event tile corresponding to the first home automation device or service, the current event tile indicating a current status of the parameter of the first home automation device or service.

* * * * *